US012696057B2

(12) United States Patent
Li et al.

(10) Patent No.: US 12,696,057 B2
(45) Date of Patent: Jul. 28, 2026

(54) COMMUNICATION METHOD AND APPARATUS, AND RELATED DEVICE

(71) Applicant: YINWANG INTELLIGENT TECHNOLOGIES CO., LTD., Shenzhen (CN)

(72) Inventors: Mingchao Li, Beijing (CN); Miao Yang, Beijing (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 321 days.

(21) Appl. No.: 18/484,886

(22) Filed: Oct. 11, 2023

(65) Prior Publication Data

US 2024/0244408 A1     Jul. 18, 2024

Related U.S. Application Data

(63) Continuation of application No. PCT/CN2022/085488, filed on Apr. 7, 2022.

(30) Foreign Application Priority Data

Apr. 12, 2021     (CN) .......................... 202110389463.1

(51) Int. Cl.
H04W 4/40          (2018.01)
H04L 61/50          (2022.01)
(Continued)

(52) U.S. Cl.
CPC .............. H04W 4/40 (2018.02); H04L 61/50 (2022.05); H04W 4/14 (2013.01); H04W 4/23 (2018.02); H04L 2101/622 (2022.05)

(58) Field of Classification Search
CPC ........... H04W 4/40; H04W 4/14; H04W 4/23; H04W 4/46; H04W 8/26; H04W 4/06;
(Continued)

(56) References Cited

U.S. PATENT DOCUMENTS

2016/0192427 A1     6/2016  Yun et al.
2016/0344469 A1     11/2016  Yi et al.
(Continued)

FOREIGN PATENT DOCUMENTS

CN       110149611 A       8/2019
CN       110166580 A       8/2019
(Continued)

OTHER PUBLICATIONS

CMCC, "Discussion on support of V2X unicast transmission", 3GPP TSG RAN WG1 Meeting #94, R1-1808837, Gothenburg, Sweden, Aug. 20-24, 2018, 4 pages.
(Continued)

*Primary Examiner* — Yaotang Wang
(74) *Attorney, Agent, or Firm* — Fish & Richardson P.C.

(57)          ABSTRACT

Embodiments of this application provide a communication method and apparatus, and a related device. The method includes: A first device sends first V2X unicast information to a second device, where the first V2X unicast information includes a first media access control MAC address and a first identifier; the first device receives second V2X unicast information from the second device, where the second V2X unicast information includes a second MAC address and a second identifier; and the first device generates another MAC address when the second V2X unicast information carries indication information, the first MAC address is the same as the second MAC address, and the first identifier is the same as the second identifier, where the indication information indicates that the second MAC address is a conflicting address.

21 Claims, 7 Drawing Sheets

(51) Int. Cl.
 *H04L 101/622*    (2022.01)
 *H04W 4/14*     (2009.01)
 *H04W 4/23*     (2018.01)

(58) Field of Classification Search
 CPC .. H04W 76/14; H04L 61/50; H04L 2101/622;
     H04L 61/5038; H04L 61/5046; H04L
        61/5092; H04L 61/3005
 See application file for complete search history.

(56) References Cited

U.S. PATENT DOCUMENTS

| | | | |
|---|---|---|---|
| 2020/0205209 A1 | 6/2020 | Pan et al. | |
| 2021/0045178 A1 | 2/2021 | Kung et al. | |
| 2021/0315033 A1* | 10/2021 | Zhao .................... | H04W 76/14 |

FOREIGN PATENT DOCUMENTS

| | | | | |
|---|---|---|---|---|
| CN | 111586643 A | | 8/2020 | |
| CN | 112004209 A | * | 11/2020 | ............. H04W 4/40 |
| CN | 112235734 A | | 1/2021 | |
| EP | 3754950 A1 | | 12/2020 | |
| KR | 20140041896 A | | 4/2014 | |
| KR | 20200023116 A | | 3/2020 | |

OTHER PUBLICATIONS

International Search Report and Written Opinion in International Appln. No. PCT/CN2022/085488, mailed on Jun. 15, 2022, 17 pages (with English translation).

Marks et al., "Local MAC Addresses in the Overview and Architecture based on IEEE Std 802c," IEEE 802ec-17-0174-00-00EC, Nov. 6, 2017, 61 pages.

De La Oliva et al., "Proposal for IEEE 802.1 CQ (Self-Assignment part)," IEEE Draft, CQ-AOLIVA-Propasal-SelfAssignmenttext-0318, Piscataway, NJ, USA, vol. 802.1, Mar. 5, 2018, 10 pages.

Extended European Search Report in European Appln No. 22787426.0, dated Jun. 7, 2024, 8 pages.

Huawei et al., "Updates to PCS unicast link establishment procedure," 3GPP TSG-CT WG1 Meeting #125-e, C1-204816, Electronic meeting, Aug. 20-28, 2020, 19 pages.

Qualcomm Incorporated et al., "Clarification on privacy requirements and L2 ID collision requirements for PC5 unicast," SA WG2 Meeting #134, S2-1907198, Sapporo, Japan, Jun. 24-28, 2019, 2 pages.

Zte et al., "Layer-2 link establishment over PCS reference point," 3GPP TSG-SA2 Meeting #135, S2-1908890, Split, Croatia, Oct. 14-18, 2019, 7 pages.

Interdigital Inc, "Link Identifier Update Procedure," 3GPP TSG SA WG2 #140e, S2-2005849, Aug. 13, 2020, retrieved from URL <https://www.3gpp.org/ftp/tsg_sa/WG2_Arch/TSGS2_140e_Electronic/Docs/S2-2005849.zip>, 9 pages.

Office Action in Japanese Appln. No. 2023-562523, mailed on Nov. 26, 2024, 6 pages (with English translation).

Office Action in Korean Appln. No. 2023-7038869, mailed on Mar. 17, 2025, 17 pages (with English translation).

* cited by examiner

DSA data
frame format

| DSA version (4bit)<br>DSA version (4 bits) | DSA header extension indicator (value=1)<br>DSA header extension indicator (value=1) | Fifth identifier (3 bits) | DSA identifier (4bit)<br>DSA identifier (4 bits) | Content count (4bit)<br>content count (4 bits) | Header extension<br>header extension | AID | Length<br>length | Data<br>data |
|---|---|---|---|---|---|---|---|---|

DSMP data
frame format

| DSMP header<br>DSMP header | Payload<br>payload |
|---|---|

MAC data
frame format

| Version<br>version | Source<br>source address | Destination<br>destination address | ... | MAC sub-headers<br>MAC sub-headers | Payload<br>payload |
|---|---|---|---|---|---|

MAC address

FIG. 7

COMMUNICATION METHOD AND APPARATUS, AND RELATED DEVICE

This application is a continuation of International Application No. PCT/CN2022/085488, filed on Apr. 7, 2022, which claims priority to Chinese patent application No. 202110389463.1, filed on Apr. 12, 2021. The disclosures of the aforementioned applications are hereby incorporated by reference in their entireties.

TECHNICAL FIELD

This application relates to the field of communication technologies, and in particular, to a communication method and apparatus, and a related device.

BACKGROUND

With the continuous development of society, the popularity of automobiles is increasingly higher. Vehicle to everything (vehicle to everything, V2X) communication may be performed to obtain road condition information or receive service information in time. A network used in V2X communication is referred to as an internet of vehicles. V2X may include vehicle to vehicle (vehicle to vehicle, V2V) communication, vehicle to infrastructure (vehicle to infrastructure, V2I) communication, vehicle to pedestrian (vehicle to pedestrian, V2P) communication, vehicle to network (vehicle to network, V2N) communication, and the like.

With the continuous development of a V2X service, V2X is no longer limited to supporting only broadcast service information, and may also support unicast service information. For example, a unicast service may include near-field charging and vehicle identity information management.

Internet of vehicles communication based on a cellular network, for example, V2X direct communication based on a long term evolution (long term evolution, LTE) technology or a 5th generation mobile communication technology (5th generation mobile network, 5th generation wireless systems, or 5th Generation, 5G or 5G technology for short), is currently an important communication means. For a terminal device based on LTE-V2X communication, a network layer of a transmitting end needs to select a source address (which is also referred to as a source layer 2 identifier) of a media access control (media access control, MAC) layer. During data sending, the selected source address is set in a corresponding address bit of a MAC PDU, to indicate an identity of the transmitting end.

Currently, a length of a MAC address is 24 bits (bits). Because an autonomous address selection manner is used, all transmitting ends actually randomly select source addresses in a same address field for use, resulting in a conflict between the selected source addresses. For a unicast service, two communication parties need to use a MAC address to address each other and perform data exchange. Once another terminal selects the same source MAC address, an entire exchange process is disordered, and the service cannot be normally performed. Therefore, in LTE-V2X-based unicast service transmission, how to effectively reduce a source MAC address conflict between transmitting ends is an urgent problem to be resolved.

SUMMARY

Embodiments of this application provide a communication method and apparatus, and a related device, so that a problem of a source MAC address conflict between transmitting ends can be effectively reduced in LTE-V2X-based unicast service transmission.

According to a first aspect, an embodiment of this application provides a communication method. The communication method includes: A first device sends first V2X unicast information to a second device, where the first V2X unicast information includes a first media access control MAC address and a first identifier; the first device receives second V2X unicast information from the second device, where the second V2X unicast information includes a second MAC address and a second identifier; and the first device reselects the first MAC address when the second V2X unicast information carries indication information, the first MAC address is the same as the second MAC address, and the first identifier is the same as the second identifier, where the indication information indicates that the second MAC address is a conflicting address.

In this embodiment of this application, in sidelink communication, a transmitting end needs to independently select a source MAC address to perform unicast service transmission with a receiving end. Because a source address in communication is of a fixed length (24 bits), when a plurality of transmitting ends select source MAC addresses in the fixed range, the plurality of transmitting ends may select a same source MAC address. As a result, service communication cannot be normally performed. In this embodiment of this application, the first V2X unicast information sent by the first device (the transmitting end) to the second device (the receiving end) not only includes the first MAC address, but also includes the first identifier. The first identifier may be understood as an additional identifier of the first device. When only the first device randomly selects the first MAC address, the first MAC address may represent the first device. When a device other than the first device randomly selects the first MAC address, the first identifier may identify the first device. The first identifier may also be understood as an identifier used to distinguish between different devices when the different devices select a same MAC address. Optionally, the first identifier may alternatively identify a first service of the first device. When the second device determines that a device other than the first device also selects the first MAC address to communicate with a unicast service of the second device, the second device may broadcast the second V2X unicast information to all transmitting ends. The second V2X unicast information carries the second MAC address and the second identifier. The second identifier may indicate a terminal whose MAC address conflict needs to be resolved. After receiving the second V2X unicast information from the second device, when the second V2X unicast information carries the indication information, the first device may determine, based on the indication information, that the second MAC address in the second V2X unicast information is a conflicting MAC address, and respectively compare, with the second MAC address and the second identifier, the first MAC address and the first identifier sent by the first device. If the first MAC address is the same as the second MAC address, and the first identifier is the same as the second identifier, the first device may determine that the first device needs to reselect the first MAC address. The first device reselects the first MAC address, so that a problem of a source MAC address conflict between the first device and another transmitting end can be reduced.

In a possible implementation, the first identifier is generated by the first device, and remains unchanged in a transmission process of a unicast service corresponding to the first V2X unicast information.

In this embodiment of this application, the first identifier remains unchanged in the transmission process of the unicast service corresponding to the first V2X unicast information, so that it can be additionally identified that a transmitting end of transmitting the unicast service corresponding to the first V2X unicast information is always the first device. In this way, after receiving the second V2X unicast information, the first device compares the first identifier with the second identifier in the second V2X unicast information. If the first identifier is the same as the second identifier, the first device may determine whether the first device needs to reselect the MAC address.

In a possible implementation, the first V2X unicast information further includes a third identifier, the third identifier changes in the transmission process of the unicast service corresponding to the first V2X unicast information. The second V2X unicast information further includes a fourth identifier. That the reselecting the first MAC address when the second V2X unicast information carries the indication information, the first MAC address is the same as the second MAC address, and the first identifier is the same as the second identifier includes: reselecting the first MAC address when the second V2X unicast information carries the indication information, the first MAC address is the same as the second MAC address, the first identifier is the same as the second identifier, and the third identifier is the same as the fourth identifier.

In this embodiment of this application, the first V2X unicast information sent by the first device to the second device may include the first MAC address and the first identifier, and may further include the third identifier. The third identifier changes in the transmission process of the unicast service corresponding to the first V2X unicast information. The second V2X unicast information sent by the second device includes the second MAC address and the second identifier, and may further include the fourth identifier. An additional identifier (the third identifier) is added to the first V2X unicast information and an additional identifier (the fourth identifier) is added to the second V2X unicast information, so that the second device can more accurately determine a transmitting end that needs to reselect a MAC address, thereby reducing impact of service transmission interruption caused by MAC address reselection by the transmitting end.

In a possible implementation, the third identifier is determined in any one of the following manners: a quantity of transmissions of the unicast service corresponding to the first V2X unicast information; a current phase of the unicast service corresponding to the first V2X unicast information; or a random value.

In this embodiment of this application, the third identifier is determined based on the quantity of transmissions of the unicast service corresponding to the first V2X unicast information, so that when determining the second identifier in the second V2X unicast information, the second device can preferably enable a transmitting end with a smaller quantity of transmissions of the unicast service to reselect a MAC address. For example, the first device randomly selects the first MAC address to perform unicast service transmission with the second device, and sends the first V2X unicast information that includes the first MAC address, the first identifier, and the third identifier to the second device. The third device randomly selects the third MAC address to perform unicast service transmission with the second device, and sends the third V2X unicast information that includes the third MAC address, the seventh identifier, and the eighth identifier to the second device, where the first MAC address is the same as the third MAC address. The third identifier is 3, indicating that the first device has initiated three transmissions to the second device, and the eighth identifier is 8, indicating that the third device has initiated eight transmissions to the second device. In this case, the second device may add the first MAC address and 3 to the second V2X unicast information (namely, the second MAC address and the fourth identifier). After receiving the second V2X unicast information, the first device determines, through comparison, that the first MAC address sent by the first device is the same as the second MAC address, the first identifier is the same as the second identifier, and the third identifier is the same as the fourth identifier. In this case, when the first device determines the MAC address needs to be reselected, and the third device does not need to reselect the MAC address, and may continue to use the current third MAC address to perform unicast service transmission with the second device, thereby reducing impact of service transmission interruption caused by MAC address reselection by the third device. Similarly, the third identifier is determined based on a current phase of a unicast service corresponding to unicast information, so that impact of service transmission interruption caused by MAC address reselection by the transmitting end can also be reduced. The third identifier is determined based on the random value, so that randomness of the third identifier can be ensured, and a possibility of reselecting the MAC address by the transmitting end can be reduced, thereby reducing impact of service transmission interruption caused by MAC address reselection by the transmitting end.

In a possible implementation, the first V2X unicast information further includes a fifth identifier, the second V2X unicast information further includes a sixth identifier, the fifth identifier indicates a manner for determining the third identifier, and the sixth identifier indicates a manner for determining the fourth identifier.

In this embodiment of this application, because the third identifier may be determined in a plurality of manners, the first device may further additionally indicate, in the first V2X unicast information by using the fifth identifier, the manner for determining the third identifier, so that the second device knows the manner for determining the third identifier. The second device adds a sixth identifier to the second V2X unicast information, to indicate the manner for determining the fourth identifier, so that the first device knows the manner for determining the fourth identifier.

In a possible implementation, the first identifier and the second identifier are dedicated short range communications service advertisement (DSRC service advertisement, DSA) identifiers, and the third identifier and the fourth identifier are content count.

In a possible implementation, the second V2X unicast information is carried by using a DSA data frame or a dedicated short message protocol (dedicated short message protocol, DSMP) data frame.

In a possible implementation, the method further includes: The first device regenerates the first identifier after reselecting the first MAC address.

According to a second aspect, an embodiment of this application provides a communication method. The communication method includes: A second device receives first V2X unicast information from a first device, where the first V2X unicast information includes a first media access control MAC address and a first identifier; and the second device sends second V2X unicast information to the first device when the first MAC address conflicts with a MAC address of a third device, where the second V2X unicast information includes indication information, a second MAC address, and a second identifier, the indication information indicates that the second MAC address is a conflicting address, the second MAC address is the same as the first MAC address, and the second identifier is the same as the first identifier.

In this embodiment of this application, in sidelink communication, a transmitting end needs to independently select a source MAC address to perform unicast service transmission with a receiving end. Because a source address in communication is of a fixed length (24 bits), when a plurality of transmitting ends select source MAC addresses in the fixed range, the plurality of transmitting ends may select a same source MAC address. As a result, service communication cannot be normally performed. In this embodiment of this application, the first V2X unicast information sent by the first device (the transmitting end) to the second device (the receiving end) not only includes the first MAC address, but also includes the first identifier. When the second device determines that a device other than the first device also selects the first MAC address to communicate with a unicast service of the second device, the second device may broadcast the second V2X unicast information to all transmitting ends. The second V2X unicast information carries the second MAC address, the second identifier, and the indication information. After receiving the second V2X unicast information from the second device, when the second V2X unicast information carries the indication information, the first device may determine, based on the indication information, that the second MAC address in the second V2X unicast information is a conflicting MAC address, and respectively compare, with the second MAC address and the second identifier, the first MAC address and the first identifier sent by the first device. If the first MAC address is the same as the second MAC address, and the first identifier is the same as the second identifier, the first device may determine that the first device needs to reselect the first MAC address. The first device reselects the first MAC address, so that a problem of a source MAC address conflict between the first device and another transmitting end can be reduced.

It should be understood that the second aspect is performed by the second device, and specific content of the second aspect corresponds to the content of the first aspect. For corresponding features of the second aspect and beneficial effect achieved by the second aspect, refer to the descriptions of the first aspect. To avoid repetition, detailed descriptions are appropriately omitted herein.

In a possible implementation, the first identifier is generated by the first device, and remains unchanged in a transmission process of a unicast service corresponding to the first V2X unicast information.

In a possible implementation, the method further includes: The second device receives third V2X unicast information from a third device, where the third V2X unicast information includes a third MAC address and a seventh identifier.

That the first MAC address conflicts with a MAC address of a third device includes: The first MAC address is the same as the third MAC address, and the first identifier is different from the seventh identifier.

In this embodiment of this application, a MAC address conflict may mean that a plurality of transmitting ends randomly select a same MAC address to perform unicast service transmission with the second device at the same time. In this way, an error of information transmission of the plurality of transmitting ends is easily caused. Therefore, the transmitting ends cannot perform unicast service transmission with the second device at the same time by using the same MAC address. It may be understood that a MAC address conflict may alternatively be another case in which a plurality of transmitting ends cannot use a same MAC address at the same time. This is not limited in this application.

In a possible implementation, the first V2X unicast information further includes a third identifier, the third identifier changes in the transmission process of the unicast service corresponding to the first V2X unicast information, the second V2X unicast information further includes a fourth identifier, and the fourth identifier is the same as the third identifier.

In a possible implementation, the method further includes: The second device receives third V2X unicast information from the third device, where the third V2X unicast information includes a third MAC address, a seventh identifier, and an eighth identifier; and the second device determines that the first MAC address is the same as the third MAC address and the first identifier is different from the seventh identifier;

That the second device sends second V2X unicast information to the first device includes: When the third identifier and the eighth identifier are determined based on a quantity of transmissions of a unicast service corresponding to unicast information, the second device sends the second V2X unicast information to the first device based on a fact that a value corresponding to the third identifier is less than a value corresponding to the eighth identifier; or when the third identifier and the eighth identifier are determined based on a current phase of a unicast service corresponding to unicast information, the second device sends the second V2X unicast information to the first device based on a fact that a value corresponding to the third identifier is less than a value corresponding to the eighth identifier; or when the third identifier and the eighth identifier are random values, the second device randomly sends the second V2X unicast information to the first device.

In this embodiment of this application, the third identifier is determined based on the quantity of transmissions of the unicast service corresponding to the first V2X unicast information, so that when determining the second identifier in the second V2X unicast information, the second device can preferably enable a transmitting end with a smaller quantity of transmissions of the unicast service to reselect a MAC address. For example, the first device randomly selects the first MAC address to perform unicast service transmission with the second device, and sends the first V2X unicast information that includes the first MAC address, the first identifier, and the third identifier to the second device. The third device randomly selects the third MAC address to perform unicast service transmission with the second device, and sends the third V2X unicast information that includes the third MAC address, the seventh identifier, and the eighth identifier to the second device, where the first MAC address is the same as the third MAC address. The third identifier is 3, indicating that the first device has initiated three transmissions to the second device, and the eighth identifier is 8, indicating that the third device has initiated eight transmissions to the second device. In this case, the second device may add the first MAC address and the third identifier to the second V2X unicast information (namely, the second MAC address and the fourth identifier). After receiving the second V2X unicast information, the first device determines, through comparison, that the first MAC address sent by the first device is the same as the second MAC address, the first identifier is the same as the second identifier, and the third identifier is the same as the fourth identifier. In this case, when the first device determines the MAC address needs to be reselected, and the third device does not need to reselect the MAC address, and may continue to use the current third MAC address to perform unicast service transmission with the second device, thereby reducing impact of service transmission interruption caused by MAC address reselection by the third device. Similarly, the third identifier is determined based on a current phase of a unicast service corresponding to unicast information, so that impact of service transmission interruption caused by MAC address reselection by the transmitting end can also be reduced. The third identifier is determined based on the random value, so that randomness of the third identifier can be ensured, and a possibility of reselecting the MAC address by the transmitting end can be reduced, thereby reducing impact of service transmission interruption caused by MAC address reselection by the transmitting end.

In a possible implementation, the first V2X unicast information further includes a fifth identifier, the second V2X unicast information further includes a sixth identifier, the fifth identifier indicates a manner for determining the third identifier, and the sixth identifier indicates a manner for determining the fourth identifier.

In a possible implementation, the first identifier and the second identifier are DSA identifiers, and the third identifier and the fourth identifier are content count.

In a possible implementation, the second V2X unicast information is carried in a DSA data frame or a DSMP data frame.

According to a third aspect, an embodiment of this application provides a communication apparatus. The communication apparatus is used in a first device. The communication apparatus may be a terminal, or may be a module (for example, a chip) in a terminal. The communication apparatus includes:

a first sending unit, configured to send first V2X unicast information to a second device, where the first V2X unicast information includes a first media access control MAC address and a first identifier;

a first receiving unit, configured to receive second V2X unicast information from the second device, where the second V2X unicast information includes a second MAC address and a second identifier; and a reselection unit, configured to reselect the first MAC address when the second V2X unicast information carries indication information, the first MAC address is the same as the second MAC address, and the first identifier is the same as the second identifier, where the indication information indicates that the second MAC address is a conflicting address.

In a possible implementation, the first identifier is generated by the first device, and remains unchanged in a transmission process of a unicast service corresponding to the first V2X unicast information.

In a possible implementation, the first V2X unicast information further includes a third identifier, the third identifier changes in the transmission process of the unicast service corresponding to the first V2X unicast information, and the second V2X unicast information further includes a fourth identifier.

That the reselection unit reselects the first MAC address when the second V2X unicast information carries the indication information, the first MAC address is the same as the second MAC address, and the first identifier is the same as the second identifier specifically includes:

reselecting the first MAC address when the second V2X unicast information carries the indication information, the first MAC address is the same as the second MAC address, the first identifier is the same as the second identifier, and the third identifier is the same as the fourth identifier.

In a possible implementation, the third identifier is determined in any one of the following manners:

a quantity of transmissions of the unicast service corresponding to the first V2X unicast information;

a current phase of the unicast service corresponding to the first V2X unicast information; or a random value.

In a possible implementation, the first V2X unicast information further includes a fifth identifier, the second V2X unicast information further includes a sixth identifier, the fifth identifier indicates a manner for determining the third identifier, and the sixth identifier indicates a manner for determining the fourth identifier.

In a possible implementation, the first identifier and the second identifier are DSA identifiers, and the third identifier and the fourth identifier are content count.

In a possible implementation, the second V2X unicast information is carried in a DSA data frame or a DSMP data frame.

In a possible implementation, the communication apparatus further includes:

a generation unit, configured to regenerate the first identifier after the first MAC address is reselected.

According to a fourth aspect, an embodiment of this application provides a communication apparatus. The communication apparatus is used in a second device. The communication apparatus may be a network device, or may be a module (for example, a chip) in a network device. The communication apparatus includes:

a second receiving unit, configured to receive first V2X unicast information from a first device, where the first V2X unicast information includes a first media access control MAC address and a first identifier; and a second sending unit, configured to: when the first MAC address conflicts with a MAC address of a third device, the second device sends second V2X unicast information to the first device, where the second V2X unicast information includes indication information, a second MAC address, and a second identifier, the indication information indicates that the second MAC address is a conflicting address, the second MAC address is the same as the first MAC address, and the second identifier is the same as the first identifier.

In a possible implementation, the first identifier is generated by the first device, and remains unchanged in a transmission process of a unicast service corresponding to the first V2X unicast information.

In a possible implementation, the second receiving unit is further configured to receive third V2X unicast information from the third device, where the third V2X unicast information includes a third MAC address and a seventh identifier.

That the first MAC address conflicts with a MAC address of a third device includes:

The first MAC address is the same as the third MAC address, and the first identifier is different from the seventh identifier.

In a possible implementation, the first V2X unicast information further includes a third identifier, the third identifier changes in the transmission process of the unicast service corresponding to the first V2X unicast information, the second V2X unicast information further includes a fourth identifier, and the fourth identifier is the same as the third identifier.

In a possible implementation, the second receiving unit is further configured to receive the third V2X unicast information from the third device, where the third V2X unicast information includes the third MAC address, the seventh identifier, and an eighth identifier.

The apparatus further includes:

a determining unit, configured to determine that the first MAC address is the same as the third MAC address and the first identifier is different from the seventh identifier.

That the second sending unit sends the second V2X unicast information to the first device specifically includes:

when the third identifier and the eighth identifier are determined based on a quantity of transmissions of a unicast service corresponding to unicast information, the second device sends the second V2X unicast information to the first device based on a fact that a value corresponding to the third identifier is less than a value corresponding to the eighth identifier; or when the third identifier and the eighth identifier are determined based on a current phase of a unicast service corresponding to unicast information, the second device sends the second V2X unicast information to the first device based on a fact that a value corresponding to the third identifier is less than a value corresponding to the eighth identifier; or when the third identifier and the eighth identifier are random values, the second device randomly sends the second V2X unicast information to the first device.

In a possible implementation, the first V2X unicast information further includes a fifth identifier, the second V2X unicast information further includes a sixth identifier, the fifth identifier indicates a manner for determining the third identifier, and the sixth identifier indicates a manner for determining the fourth identifier.

In a possible implementation, the first identifier and the second identifier are DSA identifiers, and the third identifier and the fourth identifier are content count.

In a possible implementation, the second V2X unicast information is carried in a DSA data frame or a DSMP data frame.

According to a fifth aspect, an embodiment of this application provides a communication apparatus. The apparatus may include a processor, and the processor is coupled to a memory. The memory is configured to store computer instructions. When the computer instructions are executed by the processor, the method according to the first aspect, the second aspect, or any possible implementation of the first aspect or the second aspect is implemented. Optionally, the communication apparatus may further include a communication interface, configured to communicate with another device or a communication network.

According to a sixth aspect, an embodiment of this application provides a chip system, including at least one processor and a communication interface. The communication interface and the at least one processor are interconnected through a line. The at least one processor is configured to run a computer program or instructions, to perform the method according to the first aspect, the second aspect, or any possible implementation of the first aspect or the second aspect. The chip system may include a chip, or may include a chip and another discrete component.

According to a seventh aspect, an embodiment of this application provides a computer-readable storage medium, configured to store a computer program used by the communication apparatus according to the third aspect or the fourth aspect. When the computer program is executed by a computer, the method according to the first aspect, the second aspect, or any possible implementation of the first aspect or the second aspect is implemented.

According to an eighth aspect, an embodiment of this application provides a computer program product. The computer program product may include computer instructions. When the computer instructions are executed by a processor, the method according to the first aspect, the second aspect, or any possible implementation of the first aspect or the second aspect is implemented.

According to a ninth aspect, an embodiment of this application provides a first device. The first device carries the communication apparatus according to the third aspect and a corresponding communication system, and may be configured to perform the method according to the first aspect or any possible implementation of the first aspect, so that a related function is implemented.

According to a tenth aspect, an embodiment of this application provides a second device. The second device carries the communication apparatus according to the fourth aspect and a corresponding communication system, and may be configured to perform the method according to the second aspect or any possible implementation of the second aspect, so that a related function is implemented.

BRIEF DESCRIPTION OF DRAWINGS

To describe the technical solutions in embodiments of this application more clearly, the following briefly describes the accompanying drawings for describing embodiments.

FIG. 7 is a schematic diagram of another data frame structure according to an embodiment of this application;

DESCRIPTION OF EMBODIMENTS

Figures 1, 2:
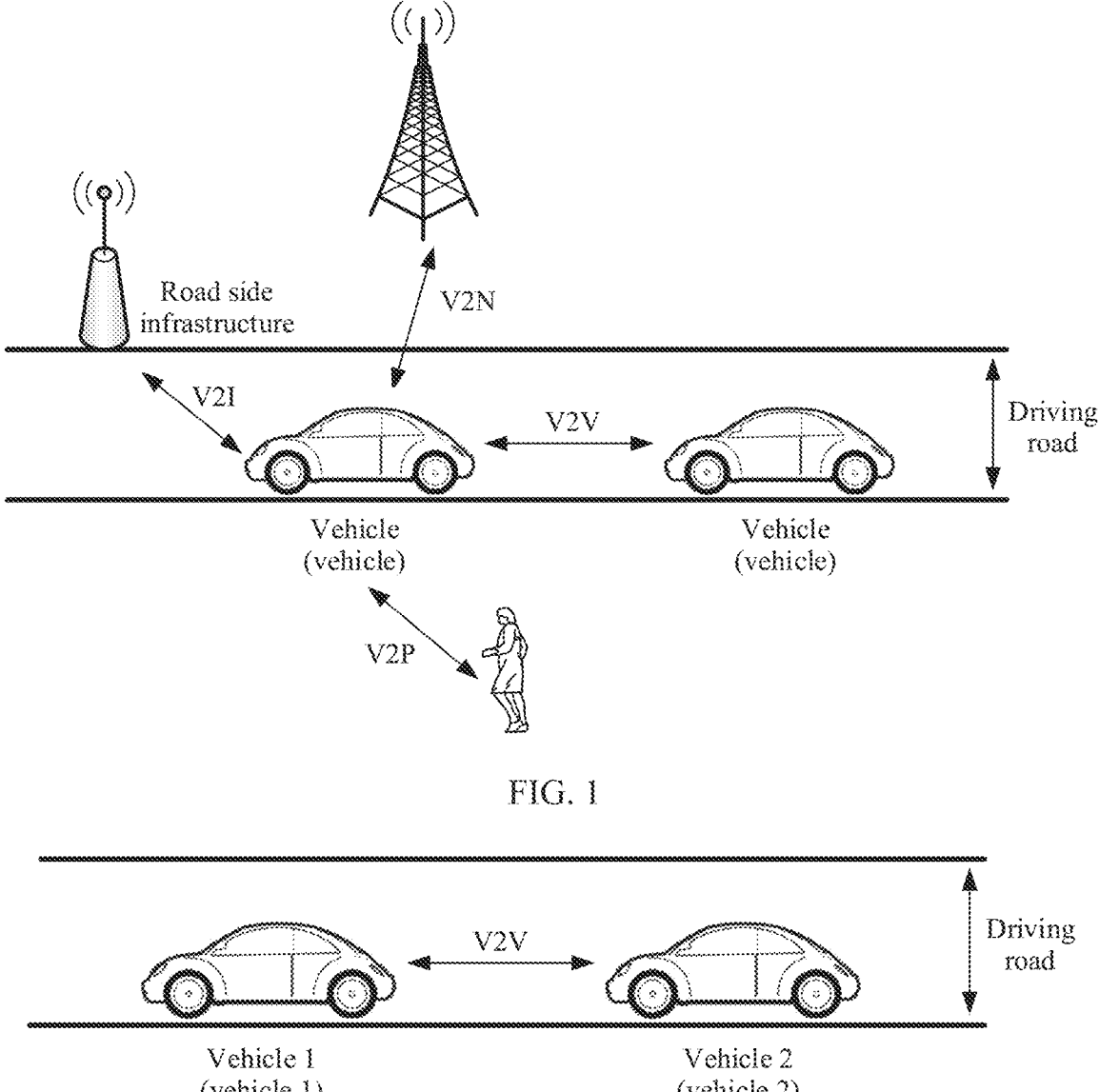
FIG. 1 is a schematic diagram of a V2X communication scenario according to an embodiment of this application.
FIG. 2 is a schematic diagram of a deployment scenario of LTE-V2X according to an embodiment of this application.

The following describes embodiments of this application with reference to the accompanying drawings in embodiments of this application.

In the specification, claims, and accompanying drawings of this application, the terms "first", "second", "third", "fourth" and so on are intended to distinguish between different objects but do not indicate a particular order. In addition, the terms "including", "having", and any other variant thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

"Embodiment" mentioned in this specification means that a particular characteristic, structure, or feature described with reference to embodiments may be included in at least one embodiment of this application. The phrase shown in various locations in the specification may not necessarily refer to a same embodiment, and is not an independent or optional embodiment exclusive from another embodiment. It is explicitly and implicitly understood by persons skilled in the art that embodiments described in the specification may be combined with another embodiment.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

Some terms in this application are first described, to help persons skilled in the art have a better understanding.

(1) An on board unit (on board unit, OBU) is usually installed on a vehicle. A road side unit (road side unit, RSU) is disposed on a road side. The OBU may communicate with the RSU. For example, the OBU may communicate with the RSU through a microwave. When the vehicle passes through the RSU, the OBU and the RSU may communicate with each other through the microwave. In an electronic toll collection (electronic toll collection, ETC) system, the OBU establishes a microwave communication link with the RSU by using a dedicated short range communications (dedicated short range communications, DSRC) technology, to implement, during travelling of the vehicle, a process such as vehicle identification or electronic fee deduction of the vehicle without stopping the vehicle.

(2) A road side unit (road side unit, RSU) is an apparatus that is installed on a road side and communicates with an on board unit (on board unit, OBU) by using a short range communications technology (for example, a cellular-V2X technology).

(3) Vehicle to everything, namely, vehicle to X (V2X), is a key technology of an intelligent transportation system, and enables communication between vehicles (V2V), a vehicle and a road side unit (V2I), a vehicle and a network (V2N), a vehicle and a pedestrian (V2P), and the like. Therefore, a series of traffic information such as real-time road conditions, road information, and pedestrian information are obtained. With a V2X system, an automated driving system can obtain more real-time data, which may be used for real-time traffic information analysis and optimal route selection, and Most common V2V and V2I are used as examples: A vehicle may broadcast information such as a speed, a driving direction, a specific position, and whether an emergency brake is stepped on to a surrounding vehicle through V2V communication, and the surrounding vehicle obtains the information, so that a driver can better perceive a traffic condition beyond a line-of-sight distance, to predict a danger in advance and perform avoidance in time. For V2I communication, in addition to interaction of the foregoing safety information, a road side infrastructure may further provide various service information, data network accesses, and the like for the vehicle, and functions such as electronic toll collection and intra-vehicle entertainment can greatly improve traffic intelligence.

(4) A PC5 interface is a direct communication interface between terminal devices that is introduced in a D2D project of the 3rd generation partnership project (3rd generation partnership project 3GPP) release 12 (Rel-12). Data transmission may be performed between neighboring terminals within an effective communication range of the PC5 through a direct link, and forwarding does not need to be performed by using a central node (for example, a base station), and information transmission does not need to be performed through a conventional cellular link. Therefore, communication is fast and convenient. Sidelink communication between V2X devices is also performed through the PC5 interface.

With the continuous development of the society, the popularity of vehicles has soared. While bringing convenience to people in traveling, vehicles also have some negative impact on human society. A rapid increase in a quantity of vehicles causes a series of problems such as urban traffic congestion, frequent traffic accidents, and worse environment quality. According to statistics, nearly 200,000 traffic accidents occurred in China in 2013, resulting in 58,000 deaths and direct economic losses of 1.04 billion yuan. A main reason for traffic accidents is the lack of timely and reliable information interaction between vehicles. FIG. 1 is a schematic diagram of a V2X communication scenario according to an embodiment of this application. As shown in FIG. 1, an internet of vehicles system (vehicle network) may improve road safety, improve traffic running efficiency, and provide a user with rich streaming media services through communication between V2V, V2I, V2P, V2N, or the like. An intelligent transportation system (intelligent transportation system, ITS) has strict requirements for low latency and high reliability of communication. An LTE-V2X technology standardized by 3GPP has advantages such as a low latency, a high speed, wide coverage, and high reliability, and is a good internet of vehicles technology.

Currently, LTE-V2X communication supports two communication manners: sidelink-based V2X communication and V2X communication based on cellular network (eNB) transition. The sidelink-based V2X communication means that direct communication is implemented between a terminal that sends data and a terminal that receives data through a sidelink. A link on which the terminal implements direct communication is referred to as a sidelink (sidelink, SL), and is also referred to as a sidelink. Further, the sidelink-based V2X communication is further classified into two communication modes: a base station scheduling mode (mode3) and an autonomous resource selection mode (mode4). In autonomous resource selection and scheduling by the terminal, a base station configures a resource pool for the terminal by using radio resource control (radio resource control, RRC) signaling (including dedicated RRC signaling or a system information block (system information block, SIB) message). The terminal autonomously obtains a resource from the resource pool to perform sidelink communication. A manner for autonomously obtaining the resource from the resource pool by the terminal may be a random resource selection manner.

With the continuous development of a V2X service, V2X is no longer limited to supporting only broadcast service information, and is also seeking to support unicast service information. Typical service information includes point-to-point interaction of sensor data between vehicles and between a vehicle and a road, near-field charging or identity information query and management between a vehicle and a road, and the like.

For a terminal device that performs communication based on an LTE-V2X sidelink, a network layer of a transmitting end needs to select a source address (which is also referred to as a source layer 2 identifier) of a MAC layer. In addition, when data is transmitted, the selected source address is set in a corresponding address bit of a MAC PDU to indicate an identity of the transmitting end. Currently, a length of a MAC address is 24 bits. Because an autonomous address selection manner is used, all transmitting ends actually randomly select source addresses in a same address field for use, which may cause a conflict between source addresses selected by different transmitting ends. For a unicast service, two communication parties need to use a MAC address to address each other and perform data exchange. Once another terminal selects the same source MAC address, an entire exchange process is disordered, and the service cannot be normally performed.

Therefore, a technical problem to be resolved in embodiments of this application may include the following: For unicast service transmission of the terminal device that performs communication based on the LTE-V2X sidelink, effective detection of a source MAC address conflict and reselection of a source MAC address can be implemented. This can reduce a problem that a service cannot be normally performed because an interaction process is disordered since different terminals select a same source MAC address.

Based on the foregoing descriptions, to better understand a communication method and a communication apparatus provided in embodiments of this application, the following first describes a system architecture to which embodiments of this application are applied.

FIG. 2 is a schematic diagram of a sidelink-based V2X communication system according to an embodiment of this application. For example, a terminal in FIG. 2 is a vehicle. In actual application, the terminal may alternatively be another type of terminal. As shown in FIG. 2, sidelink-based V2X communication means that direct communication (V2V) is implemented between a terminal (vehicle 1) that sends data and a terminal (vehicle 2) that receives data through a sidelink. Communication may be based on any wired or wireless network, including but not limited to the Internet, a wide area network, a metropolitan area network, a local area network, a virtual private network (virtual private network, VPN), a wireless communication network, and the like.

A method provided in embodiments of this application may be applied to a communication system supporting V2X service transmission. The communication system may be a 3rd generation partnership project (3rd generation partnership project, 3GPP) communication system, for example, a long term evolution (long term evolution, LTE) system, may be a 5th generation (5th generation, 5G) mobile communication system, a new radio (new radio, NR) system, or another next generation communication system, or may be a non-3GPP communication system. This is not limited.

A terminal device includes a device that provides a user with voice and/or data connectivity, for example, may include a handheld device with a wireless connection function, or a processing device connected to a wireless modem. The terminal device may communicate with a core network through a radio access network (radio access network, RAN), and exchange a voice and/or data with the RAN. The terminal device may be user equipment (user equipment, UE), a wireless terminal device, a mobile terminal device, a device-to-device (device-to-device, D2D) communication terminal device, a V2X terminal device, a machine-to-machine/machine-type communication (machine-to-machine/machine-type communication, M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer with a mobile terminal device, or a portable, pocket-sized, handheld, or computer built-in mobile apparatus, for example, a device, for example, a personal communication service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). The terminal device may alternatively include a limited device, for example, a device with relatively low power consumption, a device with a limited storage capability, or a device with a limited computing capability. For example, the terminal device includes an information sensing device, for example, a barcode, radio frequency identification (radio frequency identification, RFID), a sensor, a global positioning system (global positioning system, GPS), or a laser scanner.

By way of example, and not limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on a body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that dedicated to only one type of application function and need to collaboratively work with other devices such as smartphones, for example, various smart bands, smart helmets, or smart jewelry for monitoring physical signs.

In the communication system shown in FIG. 2, the terminal may perform one-to-one communication with another terminal in the communication system, which is unicast communication, or may perform multicast communication with a plurality of other terminals in the communication system. For example, a terminal 1 may perform unicast communication with a terminal 2, or may perform multicast communication with a terminal 2 and another terminal. This is not limited. In this embodiment of this application, the communication method provided in this embodiment of this application is described by using only unicast communication as an example. Alternatively, if the various terminal devices described above are located on a vehicle (for example, placed in the vehicle or installed in the vehicle), the terminal devices may be considered as vehicle-mounted terminal devices. The vehicle-mounted terminal device may also be considered as an OBU (on-board unit, OBU) or a communication apparatus used for an OBU. Alternatively, if the various terminal devices described above are located on a road side, for example, are infrastructures disposed on the road side, the terminal device may be implemented as a road side unit (road side unit, RSU) or a communication apparatus used for an RSU. The RSU is usually a road side unit of a V2X system, and may be configured to receive real-time traffic information sent by a traffic signal controller, an application server, a network device, or the like, and dynamically notify a related vehicle of the real-time traffic information, to avoid or reduce traffic accidents and improve traffic efficiency. The OBU is an on board unit of the V2X system, and may perform communication through a PC5 interface or an RSU/OBU, to implement vehicle to vehicle (vehicle to vehicle, V2V), vehicle to pedestrian (vehicle to pedestrian, V2P), vehicle to infrastructure (vehicle to infrastructure, V2I), and vehicle to network (vehicle to network, V2N) functions in the V2X system, and can further support a fully automated driving service.

In embodiments of this application, an apparatus configured to implement a function of the terminal device may be a terminal device, or may be an apparatus that can support the terminal device in implementing the function, for example, a chip system. The apparatus may be installed in the terminal device. In embodiments of this application, the chip system may include a chip, or may include a chip and another discrete component. In the technical solutions provided in embodiments of this application, the technical solutions provided in the embodiments of this application are described by using an example in which an apparatus configured to implement a function of a terminal is a terminal device.

It may be understood that the communication system architecture in FIG. 2 is merely an example implementation in embodiments of this application. A communication system architecture in embodiments of this application includes but is not limited to the foregoing communication system architecture.

Figure 3:
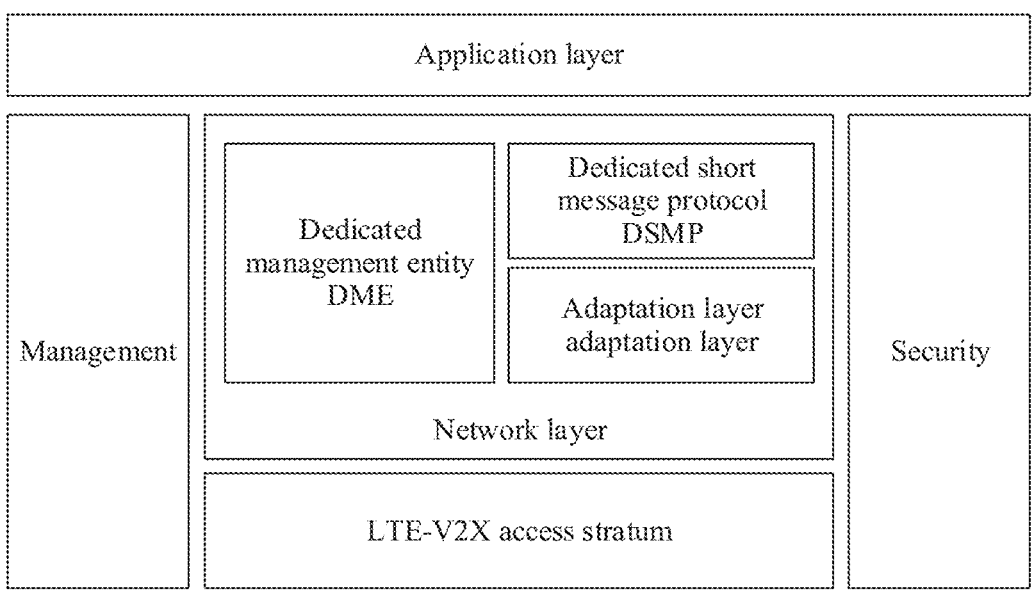
FIG. 3 is a schematic diagram of an LTE-V2X end-to-end protocol stack architecture according to an embodiment of this application.

FIG. 3 is a schematic diagram of an LTE-V2X end-to-end protocol stack architecture according to an embodiment of this application. Specifically, to support direct communication between terminals, two terminals in direct communication may establish a protocol layer shown in FIG. 3, and transmit a V2X service by using the protocol layer. As shown in FIG. 3, the two terminals (for example, a terminal 1 and a terminal 2) in direct communication include at least an access stratum (access stratum, AS), a network layer, an application layer (application layer), a management layer, and a security layer.

The access stratum is a layer used to provide functions such as communication network node addressing, communication media access control, and data transmission communication physical connection establishment, maintenance. The access stratum may provide a communication interface for communication between devices. The access stratum may include a plurality of different access technologies, such as an LTE-V2X PC5 interface and a wireless network (wireless fidelity, Wi-Fi) interface. Different access technologies may correspond to different communication interfaces.

When an access stratum technology is LTE-V2X, an access stratum protocol stack includes, from top to bottom, a packet data convergence protocol (packet data convergence protocol, PDCP) layer, a radio link control (radio link control, RLC) layer, a medium access control (medium access control, MAC) layer, and a physical layer (physical layer, PHY). The PDCP layer may be used to process data of an upper layer (above the PDCP layer). For example, in a user plane, after receiving the data from the upper layer, the PDCP layer may perform header compression and encryption on the data, and then submit (submit) the data to the RLC layer. In addition, the PDCP layer may further provide the upper layer with sequential submission and repeated packet detection functions. For example, in a control plane, the PDCP layer may provide the upper layer with an RRC signaling transmission service, and implement encryption and consistency protection of RRC signaling. The MAC layer provides a data transmission service on logical channels (logical channels). Logical channels are usually classified into two categories: control channels and traffic channels. The control channel is configured to transmit control plane information, and the service channel is configured to transmit user plane information. In addition, the MAC layer may be further responsible for mapping the logical channel to a transport channel. The PHY layer is under the MAC layer. The PHY layer is mainly responsible for mapping the transport channel to a physical channel.

The network layer is located above the access stratum and is configured to implement network topology control, data routing, device data transmission, and an application communication service. The network layer may include an adaptation layer, a dedicated management entity, and a dedicated short message protocol. For example, the network layer may include a network protocol and/or a transport protocol of an open systems interconnection model (open systems interconnection model, OSI), and is responsible for exchanging data with different applications and providing a connection-oriented service and/or data forwarding. For example, the network layer may include at least one of non-IP (non-IP) network protocols such as a DSMP, a dedicated short range communications management entity (DSRC management entity, DME), an adaptation layer (adaptation layer), a geographic location-based network protocol (GeoNetworking), a wireless access short message protocol (WAVE short message protocol, WSMP; wireless access in vehicular environments, WAVE) in an internet of vehicles environment, and a fast network and transport layer protocol (fast network and transport layer protocol, FNTP), and/or an IP network protocol. The DME provides management interfaces for all data sublayer entities, including the DSMP protocol. In addition, the network layer may further include a transport protocol, for example, a user datagram protocol (user datagram protocol, UDP)/transmission control protocol (transmission control protocol, TCP). The network layer transmits a data packet that the application layer is interested in to the application layer, and receives a data packet from the application layer.

There may be different networks and/or transport protocols at the network layer, and there may be a plurality of different access technologies at the access stratum. Therefore, the adaptation layer is configured to provide transport adaptation functions between different access technologies and different networks and/or transport protocols. For example, the adaptation layer receives a data packet transferred by an upper layer (above the adaptation layer), distinguishes a bottom layer (under the adaptation layer) access technology (for example, LTE-V2X PC5 or Wi-Fi) used by the data packet, and submits the data packet to a bottom layer (under the adaptation layer) conforming to the corresponding access technology for transmission; or receives a data packet from a bottom layer (under the adaptation layer), distinguishes a type of an upper layer (above the adaptation layer) protocol to which the data packet belongs, and submits the data packet to the corresponding upper layer protocol for processing. For another example, for different networks and/or transport protocols, different access stratum technologies may use different address information. The adaptation layer generates an access stratum address based on destination address information corresponding to the data packet, and submits the access stratum address to the access stratum.

It may be understood that the adaptation layer is a logical layer, and a function of the adaptation layer may exist as an independent layer and is also included in a "generalized network layer" or a "generalized access stratum" (for example, as a sublayer). When the function of the adaptation layer is included in the "generalized network layer", the "generalized network layer" includes at least functions of the network layer and the adaptation layer in this application. Similarly, when the function of the adaptation layer is included in the "generalized access stratum", the "generalized access stratum" includes at least functions of the access stratum and the adaptation layer in this application. As shown in FIG. 2, the adaptation layer is a sublayer of the "generalized network layer".

The application layer is located above the network layer and is a layer configured to provide the user with various types of applications and service means.

For the management layer and the security layer, the security layer is configured to provide or define a security mechanism, for example, may define a security mechanism for message layer data including at least one of the following security processing services: signature, signature verification, encryption, decryption, integrity protection, and the like. The management layer mainly implements system configuration and maintenance.

Figure 4:
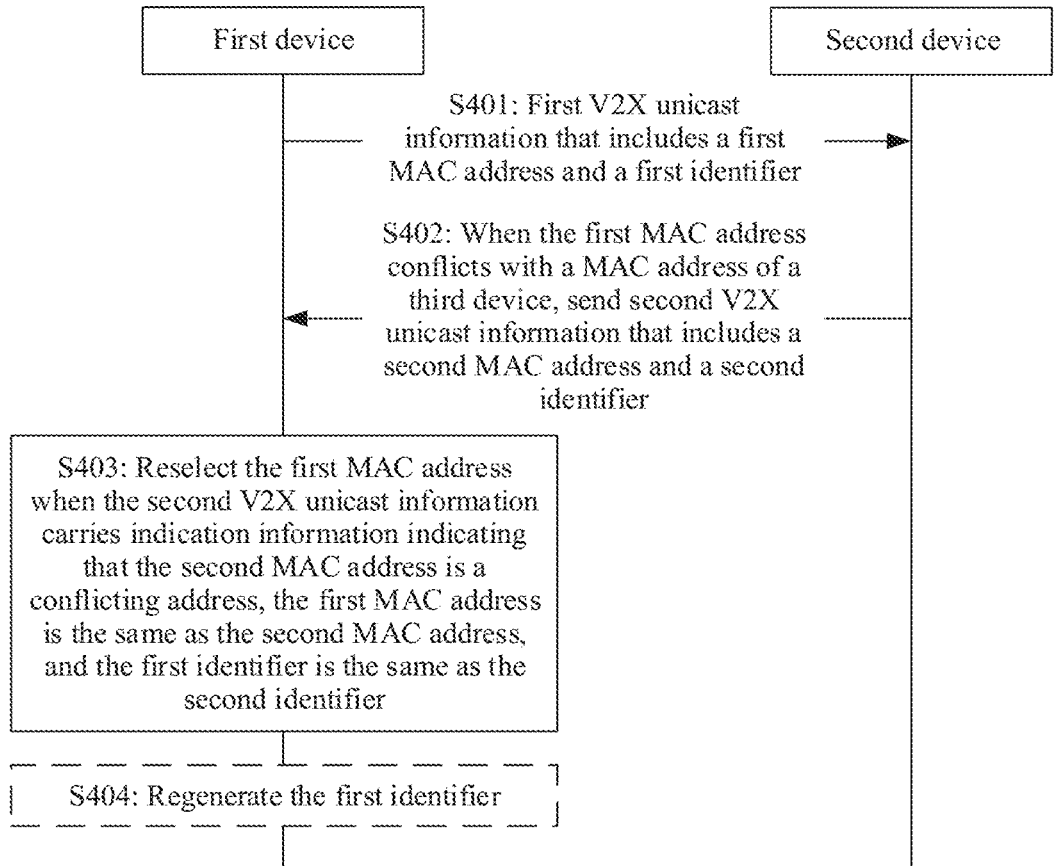
FIG. 4 is a schematic flowchart of a communication method according to an embodiment of this application.

With reference to the foregoing system architecture, the following describes a communication method according to an embodiment of this application. FIG. 4 is a schematic flowchart of a communication method according to an embodiment of this application. The method may include step S401 to step S404. Optionally, the method may include step S404. A first device and a second device are the terminals described above.

Step S401: The first device sends first V2X unicast information that includes a first MAC address and a first identifier to the second device.

Correspondingly, the second device receives, from the first device, the first V2X unicast information that includes the first MAC address and the first identifier.

Before the first device needs to perform unicast service transmission with the second device, the first device may first determine the first MAC address and the first identifier, and then send the first V2X unicast information to the second device. The first V2X unicast information includes the first MAC address and the first identifier. The first MAC address is a MAC address randomly selected by the first device.

Specifically, with reference to the protocol stack architecture shown in FIG. 3, a functional entity of a network layer of the first device may randomly select the first MAC address. For example, an adaptation layer at the network layer may randomly select the first MAC address, or a dedicated management entity DME at the network layer may randomly select the first MAC address.

Further, the first MAC address may be directly encapsulated in a DSA data frame or a DSMP data frame, or may be encapsulated in a destination address in a MAC PDU sent by the second device.

The MAC address in embodiments of this application may be a source MAC address. This is uniformly described herein, and details are not described subsequently.

The first identifier may be understood as an additional identifier of the first device. When only the first device randomly selects the first MAC address, the first MAC address may represent the first device. When a device other than the first device randomly selects the first MAC address, the first identifier may identify the first device. The first identifier may also be understood as an identifier used to distinguish between different devices when the different devices select a same MAC address. Optionally, the first identifier may alternatively identify a first service of the first device.

Optionally, the first identifier remains unchanged in a transmission process of a unicast service corresponding to the first V2X unicast information. The first identifier may be generated when the first device performs unicast service transmission with the second device for the first time, or may be generated when the first device reselects the first MAC address. In an embodiment, the first identifier may be a DSA identifier (DSA identifier), and is located in a DSA data frame generated by the dedicated management entity.

Step S402: When the first MAC address conflicts with a MAC address of a third device, the second device sends second V2X unicast information that includes a second MAC address and a second identifier to the first device.

Correspondingly, the first device receives, from the second device, the second V2X unicast information that includes the second MAC address and the second identifier.

After receiving, from the first device, the first V2X unicast information that includes the first MAC address and the first identifier, the second device may perform conflict detection on the first MAC address. That is, whether the first MAC address conflicts with the MAC address of the third device may be determined based on all the stored received MAC addresses.

The third device is a device that establishes unicast communication with the second device. When establishing unicast communication with the second device, the third device sends third V2X unicast information to the second device. The third V2X unicast information includes a third MAC address and a seventh identifier. The third MAC address is a MAC address randomly selected by the third device. The seventh identifier may be understood as an additional identifier of the third device. When only the third device randomly selects the third MAC address, the third MAC address may represent the third device. When a device other than the third device randomly selects the third MAC address, the seventh identifier may identify the third device. The seventh identifier may also be understood as an identifier used to distinguish between different devices when the different devices select a same MAC address. Optionally, the seventh identifier may alternatively identify a service of the third device.

Optionally, the seventh identifier remains unchanged in a transmission process of a unicast service corresponding to the third V2X unicast information. The seventh identifier may be generated when the third device performs unicast service transmission with the second device for the first time, or may be generated when the third device reselects the third MAC address. In an embodiment, the seventh identifier may be a DSA identifier (DSA identifier), and is located in a DSA data frame generated by the dedicated management entity.

That the first MAC address conflicts with a MAC address of a third device may be understood as that the first MAC address is the same as the third MAC address and the first identifier is different from the seventh identifier. For example, if the first MAC address randomly selected by the first device is 1, and the third MAC address randomly selected by the third device is also 1, after receiving the unicast information from the first device and the third device, the second device may determine, based on MAC address information in the respective unicast information of the first device and the third device, that the first MAC address conflicts with the third MAC address.

When the second device determines that the first MAC address conflicts with the third MAC address, the second device may broadcast the second V2X unicast information to all devices that establish unicast communication with the second device and that include the first device and the third device. The second V2X unicast information includes the second MAC address and the second identifier, and may further include indication information. The indication information indicates that the second MAC address is a conflicting address. The second identifier may indicate a terminal whose MAC address conflict needs to be resolved. Specifically, the network layer of the second device may determine whether the first MAC address conflicts with the third MAC address. The second V2X unicast information may be carried in a DSA data frame or a DSMP data frame. The indication information may be an AID identifier in the data frame. The AID identifier indicates that the second MAC address is a conflicting address and the second identifier is a conflicting identifier in data written in the DSA data frame or the DSMP data frame sent by the second device. The second MAC address may be the first MAC address or the third MAC address, and the second identifier may be the first identifier or the seventh identifier.

It may be understood that the MAC address conflict described in embodiments of this application may be a case in which MAC addresses are the same. For example, if the third MAC address is the same as the first MAC address, it is determined that the third MAC address conflicts with the first MAC address. The MAC address conflict may alternatively be another case in which the first MAC address cannot be used (the first device needs to reselect the first MAC address). This is not limited in this application.

Step S403: The first device reselects the first MAC address when the second V2X unicast information carries the indication information indicating that the second MAC address is a conflicting address, the first MAC address is the same as the second MAC address, and the first identifier is the same as the second identifier.

After sending the first V2X unicast information carrying the first MAC address and the first identifier to the second device, the first device stores the first MAC address and the first identifier.

After the first device receives, from the second device, the second V2X unicast information that includes the second MAC address and the second identifier, if the second V2X unicast information carries the indication information, the first device may determine, based on the indication information, that the received second MAC address is a conflicting address, and determine, based on the second identifier, the terminal whose MAC address conflict needs to be resolved. The first device compares, with the second MAC address and the second identifier, the first MAC address and the first identifier that are stored by the first device and that have been sent to the second device. If the first MAC address is the same as the second MAC address, and the first identifier is the same as the second identifier, the first device may determine that the terminal whose MAC address conflict needs to be resolved is the first device, and reselect the first MAC address.

Step S404: The first device regenerates the first identifier.

After reselecting the first MAC address, the first device may further regenerate the first identifier.

Figure 5:
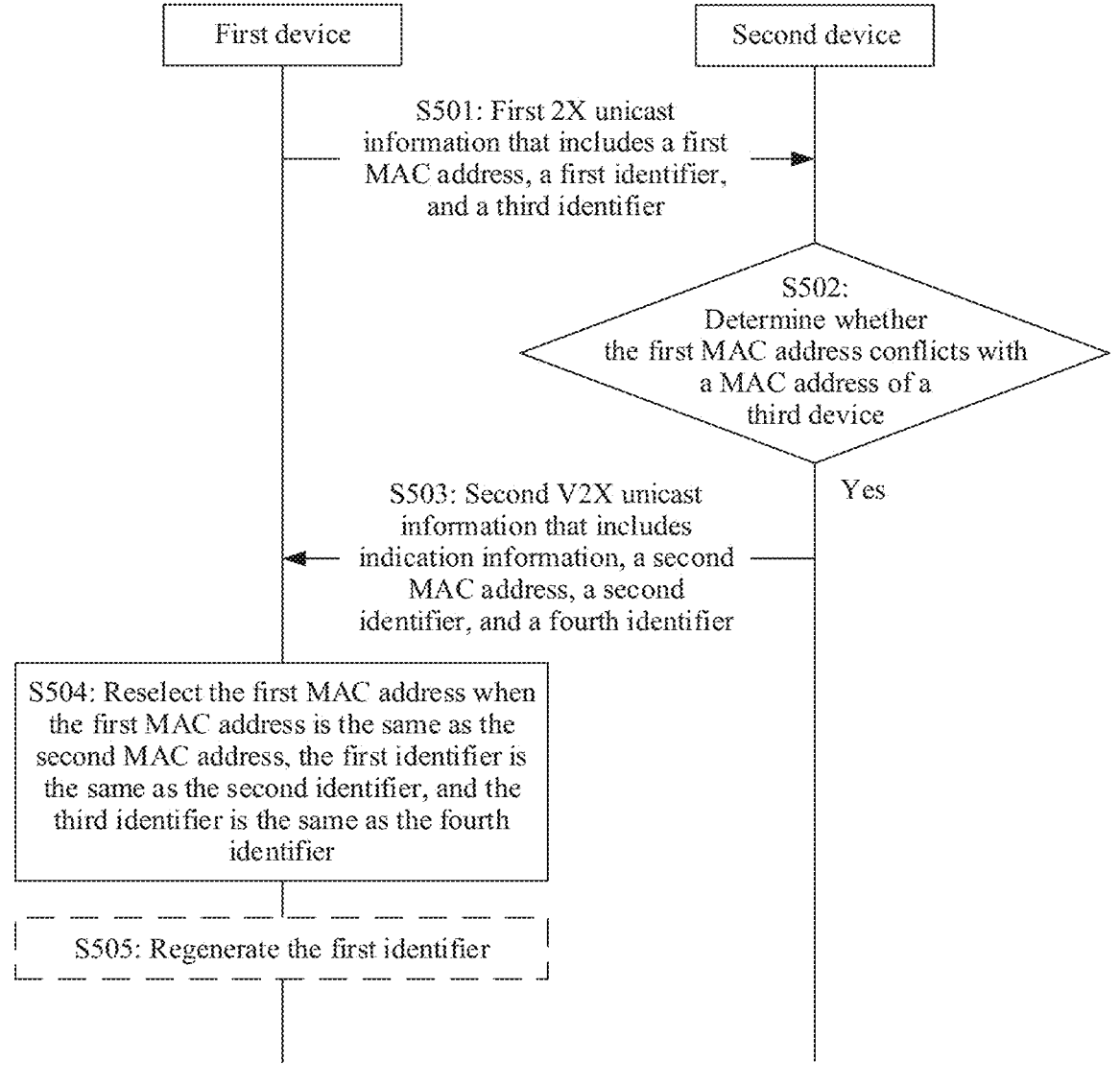
FIG. 5 is a schematic flowchart of another communication method according to an embodiment of this application.

With reference to the foregoing system architecture, the following describes another communication method according to an embodiment of this application. FIG. 5 is a schematic flowchart of another communication method according to an embodiment of this application. The method may include step S501 to step S505. Optionally, the method may include step S505. A first device and a second device are the terminals described above.

Step S501: The first device sends first V2X unicast information that includes a first MAC address, a first identifier, and a third identifier to the second device.

Correspondingly, the second device receives, from the first device, the first V2X unicast information that includes the first MAC address, the first identifier, and the third identifier.

Before the first device needs to perform unicast service transmission with the second device, the first device may first determine the first MAC address, the first identifier, and the third identifier, and then send the first V2X unicast information to the second device. The first V2X unicast information includes the first MAC address, the first identifier, and the third identifier. The first MAC address is a MAC address randomly selected by the first device.

Specifically, with reference to the protocol stack architecture shown in FIG. 3, a functional entity of a network layer of the first device may randomly select the first MAC address. For example, an adaptation layer at the network layer may randomly select the first MAC address, or a dedicated management entity DME at the network layer may randomly select the first MAC address.

Further, the first MAC address may be directly encapsulated in a DSA data frame or a DSMP data frame, or may be encapsulated in a destination address in a MAC PDU sent by the second device.

The first identifier may be understood as an additional identifier of the first device. When only the first device randomly selects the first MAC address, the first MAC address may represent the first device. When a device other than the first device randomly selects the first MAC address, the first identifier may identify the first device. The first identifier may also be understood as an identifier used to distinguish between different devices when the different devices select a same MAC address. Optionally, the first identifier may alternatively identify a first service of the first device.

Optionally, the first identifier remains unchanged in a transmission process of a unicast service corresponding to the first V2X unicast information. The first identifier may be generated when the first device performs unicast service transmission with the second device for the first time, or may be generated when the first device reselects the first MAC address. In an embodiment, the first identifier may be a DSA identifier (DSA identifier), and is located in the DSA data frame generated by the dedicated management entity.

The third identifier changes in the transmission process of the unicast service corresponding to the first V2X unicast information. It may be understood that the third identifier uses different values in different interaction steps in an entire process of current unicast service interaction corresponding to the first V2X unicast information. In an embodiment, the third identifier may be a content count (content count) field in the DSA data frame.

Figure 6:
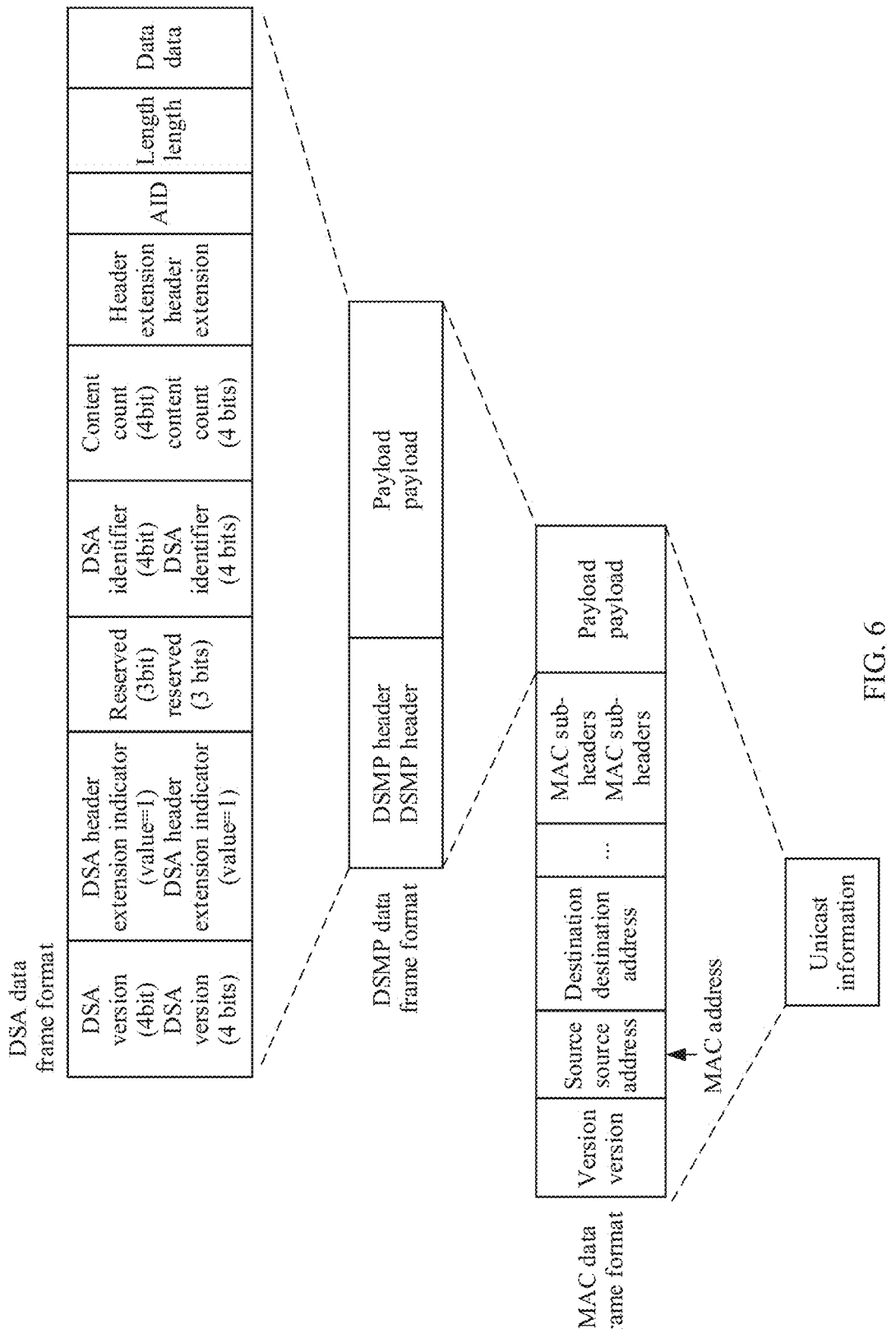
FIG. 6 is a schematic diagram of a data frame structure according to an embodiment of this application.

In an embodiment, the first V2X unicast information includes the first identifier and the third identifier. If the first identifier is a DSA identifier (DSA identifier), and the third identifier is a content count (content count) field, for a frame structure of the first V2X unicast information, refer to FIG. 6. FIG. 6 is a schematic diagram of a data frame structure according to an embodiment of this application. As shown in FIG. 6, the first V2X unicast information may include a MAC data frame, and the MAC data frame may include a version (version) field, an address (source) field, a destination address (destination) field, a MAC sub-headers (MAC sub-headers) field, and a payload (Payload) field. The payload (Payload) field includes a DSMP data frame, and the DSMP data frame may include a DSMP header (DSMP Header) field and a payload (Payload) field. The payload (Payload) field includes a DSA data frame, and the DSA data frame may include a DSA version (DSA Version) field, a DSA header extension indicator (DSA Header Extension Indicator) field, a reserved (Reserved) field, a DSA identifier (DSA identifier) field, a content count (content count) field, a header extension (Header Extension) field, an AID field, a length (Length) field, and a data (Data) field.

The third identifier may be determined in any one of the following manners.

Manner 1: a quantity of transmissions of the unicast service corresponding to the first V2X unicast information. For example, the third identifier is set to a quantity of transmissions initiated by the first device to the second device in this unicast service interaction. Optionally, once the quantity of transmissions reaches a maximum value, the quantity of transmissions starts to be counted again.

Manner 2: a current phase of the unicast service corresponding to the first V2X unicast information. For example, the third identifier is set to a current phase of current unicast service interaction. For example, 0 represents a link communication establishment phase of the unicast service, and 1 represents a security information channel establishment phase. If the first device conflicts with a source MAC address of another transmitting end in the security information channel establishment phase, and the first device needs to reselect the MAC address, after reselecting the MAC address, the first device may continue to perform service transmission to the second device from the security information channel establishment phase, and does not need to start service transmission again. In this way, a waste of transmission resources can be reduced, and transmission period can be saved.

Manner 3: random value. For example, the third identifier is set to the random value.

It may be understood that the foregoing illustrated manners are merely some examples, and the third identifier may alternatively be determined in another determining manner. This is not limited in this application.

Optionally, the first V2X unicast information may further include a fifth identifier, and the fifth identifier identifies a manner for determining the third identifier. The first device may set the fifth identifier based on the selected manner for determining the third identifier. For example, the fifth identifier may be of a 3-bit length: 000 represents that the third identifier is determined based on the quantity of transmissions initiated by the first device to the second device in this unicast service interaction; 001 represents that the third identifier is determined based on the current phase of this unicast service interaction; and 010 represents that the third identifier is determined based on the random value.

In an embodiment, the fifth identifier may be located in the DSA data frame. When the first V2X unicast information includes the first identifier, the third identifier, and the fifth identifier, if the first identifier is a DSA identifier (DSA identifier), the third identifier is a content count (content count) field, and the fifth identifier is located in the DSA data frame, for a frame structure of the first V2X unicast information, refer to FIG. 7. FIG. 7 is a schematic diagram of another data frame structure according to an embodiment of this application. As shown in FIG. 7, the first V2X unicast information may include a MAC data frame, and the MAC data frame may include a version (version) field, an address (source) field, a destination address (destination) field, a MAC sub-headers (MAC sub-headers) field, and a payload (Payload) field. The payload (Payload) field includes a DSMP data frame, and the DSMP data frame may include a DSMP header (DSMP Header) field and a payload (Payload) field. The payload (Payload) field includes a DSA data frame, and the DSA data frame may include a DSA version (DSA Version) field, a DSA header extension indicator (DSA Header Extension Indicator) field, a fifth identifier field, a DSA identifier (DSA identifier) field, a content count (content count) field, a header extension (Header Extension) field, an AID field, a length (Length) field, and a data (Data) field.

Step S502: The second device determines whether the first MAC address conflicts with a MAC address of a third device. If the first MAC address conflicts with the MAC address of the third device, step S503 is performed.

After receiving, from the first device, the first V2X unicast information that includes the first MAC address, the first identifier, and the third identifier, the second device may perform conflict detection on the first MAC address. That is, whether the first MAC address conflicts with the MAC address of the third device may be determined based on all the stored received MAC addresses. When the first MAC address conflicts with the MAC address of the third device, step S503 is performed.

The third device is a device that establishes unicast communication with the second device. When establishing unicast communication with the second device, the third device sends third V2X unicast information to the second device. The third V2X unicast information includes a third MAC address, a seventh identifier, and an eighth identifier. The third MAC address is a MAC address randomly selected by the third device. The seventh identifier may be understood as an additional identifier of the third device. When only the third device randomly selects the third MAC address, the third MAC address may represent the third device. When a device other than the third device randomly selects the third MAC address, the seventh identifier may identify the third device. The seventh identifier may also be understood as an identifier used to distinguish between different devices when the different devices select a same MAC address. Optionally, the seventh identifier may alternatively identify a service of the third device.

Optionally, the seventh identifier remains unchanged in a transmission process of a unicast service corresponding to the third V2X unicast information. The seventh identifier may be generated when the third device performs unicast service transmission with the second device for the first time, or may be generated when the third device reselects the third MAC address. In an embodiment, the seventh identifier may be a DSA identifier (DSA identifier), and is located in the DSA data frame generated by the dedicated management entity.

The eighth identifier changes in the transmission process of the unicast service corresponding to the third V2X unicast information. It may be understood that the eighth identifier uses different values in different interaction steps in an entire process of current unicast service interaction corresponding to the third V2X unicast information. In an embodiment, the eighth identifier may be a content count (content count) field in the DSA data frame.

The eighth identifier may be determined in any one of the following manners.

Manner 1: a quantity of transmissions of the unicast service corresponding to the third V2X unicast information. For example, the eighth identifier is set to a quantity of transmissions initiated by the third device to the second device in this unicast service interaction. Optionally, once the quantity of transmissions reaches a maximum value, the quantity of transmissions starts to be counted again.

Manner 2: a current phase of the unicast service corresponding to the third V2X unicast information. For example, the eighth identifier is set to a current phase of current unicast service interaction. For example, 0 represents a link communication establishment phase of the unicast service, and 1 represents a security information channel establishment phase. If the third device conflicts with a source MAC address of another transmitting end in the security information channel establishment phase, and the third device needs to reselect the MAC address, after reselecting the MAC address, the third device may continue to perform service transmission to the second device from the security information channel establishment phase, and does not need to start service transmission again. In this way, a waste of transmission resources can be reduced, and transmission period can be saved.

Manner 3: random value. For example, the eighth identifier is set to the random value.

It may be understood that the foregoing illustrated manners are merely some examples, and the eighth identifier may alternatively be determined in another determining manner. This is not limited in this application.

Optionally, the third V2X unicast information may further include a ninth identifier. The ninth identifier identifies a manner for determining the eighth identifier. The third device may determine the ninth identifier based on the selected manner for determining the eighth identifier. For example, the ninth identifier may be of a 3-bit length: 000 represents that the eighth identifier is determined based on the quantity of transmissions initiated by the third device to the second device in this unicast service interaction; 001 represents that the eighth identifier is determined based on the current phase of this unicast service interaction; and 010 represents that the eighth identifier is determined based on the random value.

That the first MAC address conflicts with a MAC address of a third device may be understood as that the first MAC address is the same as the third MAC address and the first identifier is different from the seventh identifier. For example, if the first MAC address randomly selected by the first device is 1, and the third MAC address randomly selected by the third device is also 1, after receiving the unicast information from the first device and the third device, the second device may determine, based on MAC address information in the respective unicast information of the first device and the third device, that the first MAC address conflicts with the third MAC address.

Specifically, the network layer of the second device may determine whether the first MAC address conflicts with the third MAC address.

It may be understood that the MAC address conflict described in embodiments of this application may be a case in which MAC addresses are the same. For example, if the third MAC address is the same as the first MAC address, it is determined that the third MAC address conflicts with the first MAC address. The MAC address conflict may alternatively be another case in which the first MAC address cannot be used (the first device needs to reselect the first MAC address). This is not limited in this application.

Step S503: The second device sends second V2X unicast information that includes indication information, a second MAC address, a second identifier, and a fourth identifier to the first device.

When the second device determines that the first MAC address conflicts with the third MAC address, the second device broadcasts the second V2X unicast information to all devices that establish unicast communication with the second device and that include the first device and the third device. The second V2X unicast information includes the indication information, the second MAC address, the second identifier, and the fourth identifier. The indication information indicates that the second MAC address is a conflicting address. The second identifier and the fourth identifier may together indicate a terminal whose MAC address conflict needs to be resolved.

An implementation in which the second device determines the second V2X unicast information may be as follows.

In an embodiment, if the third identifier and the eighth identifier are determined based on a quantity of transmissions of a unicast service corresponding to unicast information, the second device may determine, based on a fact that a value corresponding to the third identifier is less than (or greater than or equal to) a value corresponding to the eighth identifier, that the first MAC address, the second identifier, and the fourth identifier in the second V2X unicast information are the first MAC address, the first identifier, and the third identifier, respectively. If the third identifier and the eighth identifier are determined based on a current phase of a unicast service corresponding to unicast information, the second device may determine, based on a fact that a value corresponding to the third identifier is less than (or greater than or equal to) a value corresponding to the eighth identifier, that the first MAC address, the second identifier, and the fourth identifier in the second V2X unicast information are the first MAC address, the first identifier, and the third identifier, respectively. If the third identifier and the eighth identifier are determined based on the random value, the second device may determine, based on a fact that a value corresponding to the third identifier is less than (or greater than or equal to) a value corresponding to the eighth identifier, that the first MAC address, the second identifier, and the fourth identifier in the second V2X unicast information are the first MAC address, the first identifier, and the third identifier, respectively. For example, if the third identifier and the eighth identifier are determined based on the quantity of transmissions of the unicast service corresponding to the unicast information, the third identifier is 2, indicating that the first device has initiated two transmissions to the second device, and the eighth identifier is 9, indicating that the third device has initiated nine transmissions to the second device. In this case, the second device may determine that the second MAC address is the first MAC address, the second identifier is the first identifier, and the fourth identifier is 2. In this way, a device that has performed a large quantity of transmissions in a unicast service process can maintain normal transmission, and access of a device that performs a small quantity of transmissions is preferably considered to be rejected (that is, the first device reselects the MAC address, and the third device does not need to reselect the MAC address). For another example, if the third identifier and the eighth identifier are determined based on the current phase of the unicast service corresponding to the unicast information, the third identifier is 3, indicating that a service between the first device and the second device has entered a third phase, and the eighth identifier is 6, indicating that a service between the third device and the second device has entered a sixth phase. In this case, the second device may determine that the second MAC address is the first MAC address, the second identifier is the first identifier, and the fourth identifier is 3. In this way, a device whose unicast service has been performed in many phases can maintain normal transmission, and access of a device whose unicast service is performed in few phases is preferably considered to be rejected (that is, the first device reselects the MAC address, and the third device does not need to reselect the MAC address).

In another embodiment, the first identifier may identify a specific service (for example, a first service) of the first device, and the second device may jointly determine the second V2X unicast information based on a sum of values corresponding to the first identifier and the third identifier. Specifically, the first service may have a corresponding value based on a priority of the service. If the sum of the values corresponding to the first identifier and the third identifier is less than (or greater than or equal to) a sum of values corresponding to the seventh identifier and the eighth identifier, the second device may determine that the first MAC address, the second identifier, and the fourth identifier in the second V2X unicast information are the first MAC address, the first identifier, and the third identifier, respectively. For example, if a service currently transmitted by the first device is an emergency service, and a value corresponding to a priority is 10, the first identifier is 10, and if a service currently transmitted by the third device is a common service, and a value corresponding to a priority is 4, the seventh identifier is 5, and both the third identifier and the eighth identifier are 6. In this case, the sum of the values corresponding to the first identifier and the third identifier is 16, the sum of the values corresponding to the seventh identifier and the eighth identifier is 11, and the second device may determine that the second MAC address is the first MAC address, the second identifier is 10, and the fourth identifier is 6. In this way, transmission of the emergency service of the terminal can be avoided as much as possible, and impact of service interruption can be reduced.

Optionally, when the first V2X unicast information further includes the fifth identifier, the third V2X unicast information may further include the ninth identifier, and the second V2X unicast information may further include a sixth identifier. The fifth identifier identifies the manner for determining the third identifier, the sixth identifier identifies a manner for determining the fourth identifier, and the ninth identifier identifies the manner for determining the eighth identifier.

After determining the second V2X unicast information, the second device may broadcast the second V2X unicast information to all the devices that establish unicast communication with the second device and that include the first device and the third device. The second V2X unicast information may be carried in a DSA data frame or a DSMP data frame. The indication information may be an AID identifier in the data frame. The AID identifier indicates that the second MAC address is a conflicting address in data written in the DSA data frame or the DSMP data frame sent by the second device.

Step S504: The first device reselects the first MAC address when the first MAC address is the same as the second MAC address, the first identifier is the same as the second identifier, and the third identifier is the same as the fourth identifier.

After sending the first V2X unicast information that includes the first MAC address, the first identifier, and the third identifier to the second device, the first device stores the first MAC address, the first identifier, and the third identifier.

After receiving, from the second device, the second V2X unicast information that includes the indication information, the second MAC address, the second identifier, and the fourth identifier, the first device may determine, based on the indication information, that the received second MAC address is a conflicting address. The first device compares the first MAC address, the first identifier, and the third identifier that are stored by the first device and that have been sent to the second device with the second MAC address, the second identifier, and the fourth identifier one by one. If the first MAC address is the same as the second MAC address, the first identifier is the same as the second identifier, and the third identifier is the same as the fourth identifier, the first device needs to reselect the first MAC address.

Optionally, when the first V2X unicast information further includes the fifth identifier, and the second V2X unicast information further includes the sixth identifier, the first device compares the first MAC address, the first identifier, the third identifier, and the fifth identifier that are stored by the first device and that have been sent to the second device with the second MAC address, the second identifier, the fourth identifier, and the sixth identifier one by one. If the first MAC address is the same as the second MAC address, the first identifier is the same as the second identifier, the third identifier is the same as the fourth identifier, and the fifth identifier is the same as the sixth identifier, the first device needs to reselect the first MAC address.

Step S505: The first device regenerates the first identifier.

After reselecting the first MAC address, the first device may further regenerate the first identifier.

The foregoing describes the method embodiments provided in embodiments of this application, and the following describes virtual apparatus embodiments related to embodiments of this application.

Figure 8:
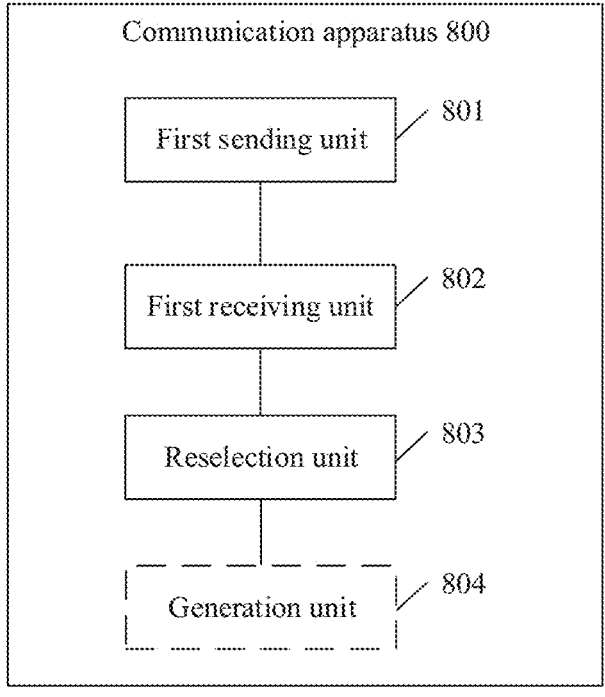
FIG. 8 is a schematic diagram of a structure of a communication apparatus according to an embodiment of this application.

FIG. 8 is a schematic diagram of a structure of a communication apparatus according to an embodiment of this application. The communication apparatus is used in a first device. The communication apparatus may be a terminal, or may be a module (for example, a chip) in a terminal. As shown in FIG. 8, a communication apparatus 800 includes at least a first sending unit 801, a first receiving unit 802, a reselection unit 803, and a generation unit 804. The generation unit 804 is optional.

The first sending unit 801 is configured to send first V2X unicast information to a second device, where the first V2X unicast information includes a first media access control MAC address and a first identifier;

The first receiving unit 802 is configured to receive second V2X unicast information from the second device, where the second V2X unicast information includes a second MAC address and a second identifier;

The reselection unit 803 is configured to reselect the first MAC address when the second V2X unicast information carries indication information, the first MAC address is the same as the second MAC address, and the first identifier is the same as the second identifier, where the indication information indicates that the second MAC address is a conflicting address.

In an embodiment, the first identifier is generated by the first device, and remains unchanged in a transmission process of a unicast service corresponding to the first V2X unicast information.

In an embodiment, the first V2X unicast information further includes a third identifier, the third identifier changes in the transmission process of the unicast service corresponding to the first V2X unicast information, and the second V2X unicast information further includes a fourth identifier.

That the reselection unit reselects the first MAC address when the second V2X unicast information carries the indication information, the first MAC address is the same as the second MAC address, and the first identifier is the same as the second identifier specifically includes:

reselecting the first MAC address when the second V2X unicast information carries the indication information, the first MAC address is the same as the second MAC address, the first identifier is the same as the second identifier, and the third identifier is the same as the fourth identifier.

In an embodiment, the third identifier is determined in any one of the following manners:

a quantity of transmissions of the unicast service corresponding to the first V2X unicast information;

a current phase of the unicast service corresponding to the first V2X unicast information; or a random value.

In an embodiment, the first V2X unicast information further includes a fifth identifier, the second V2X unicast information further includes a sixth identifier, the fifth identifier indicates a manner for determining the third identifier, and the sixth identifier indicates a manner for determining the fourth identifier.

In an embodiment, the first identifier and the second identifier are DSA identifiers, and the third identifier and the fourth identifier are content count.

In an embodiment, the second V2X unicast information is carried in a DSA data frame or a DSMP data frame.

In an embodiment, the communication apparatus 800 may further include:

the generation unit 804, configured to regenerate the first identifier after the first MAC address is reselected.

For more detailed descriptions of the first sending unit 801, the first receiving unit 802, the reselection unit 803, and the generation unit 804, directly refer to related descriptions of the network device in the method embodiments shown in FIG. 4 and FIG. 5. Details are not described herein again.

Figure 9:
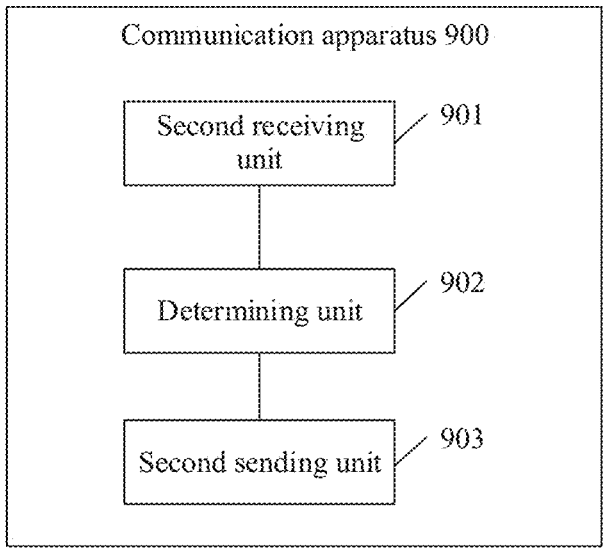
FIG. 9 is a schematic diagram of a structure of another communication apparatus according to an embodiment of this application.

FIG. 9 is a schematic diagram of a structure of another communication apparatus according to an embodiment of this application. The communication apparatus is applied to a second device. The communication apparatus may be a network device, or may be a module (for example, a chip) in a network device. As shown in FIG. 9, a communication apparatus 900 includes at least a second receiving unit 901 and a second sending unit 902.

The second receiving unit 901 is configured to receive first V2X unicast information from a first device, where the first V2X unicast information includes a first media access control MAC address and a first identifier.

The second sending unit 902 is configured to: when the first MAC address conflicts with a MAC address of a third device, the second device sends second V2X unicast information to the first device, where the second V2X unicast information includes indication information, a second MAC address, and a second identifier, the indication information indicates that the second MAC address is a conflicting address, the second MAC address is the same as the first MAC address, and the second identifier is the same as the first identifier.

In an embodiment, the first identifier is generated by the first device, and remains unchanged in a transmission process of a unicast service corresponding to the first V2X unicast information.

In an embodiment, the second receiving unit 901 is further configured to receive third V2X unicast information from the third device, where the third V2X unicast information includes a third MAC address and a seventh identifier.

That the first MAC address conflicts with a MAC address of a third device includes:

The first MAC address is the same as the third MAC address, and the first identifier is different from the seventh identifier.

In an embodiment, the first V2X unicast information further includes a third identifier, the third identifier changes in the transmission process of the unicast service corresponding to the first V2X unicast information, the second V2X unicast information further includes a fourth identifier, and the fourth identifier is the same as the third identifier.

In an embodiment, the second receiving unit 901 is further configured to receive the third V2X unicast information from the third device, where the third V2X unicast information includes the third MAC address, the seventh identifier, and an eighth identifier.

The communication apparatus 900 may further include:

a determining unit 903, configured to determine that the first MAC address is the same as the third MAC address and the first identifier is different from the seventh identifier.

That the second sending unit 902 is configured to send the second V2X unicast information to the first device specifically includes:

when the third identifier and the eighth identifier are determined based on a quantity of transmissions of a unicast service corresponding to unicast information, the second device sends the second V2X unicast information to the first device based on a fact that a value corresponding to the third identifier is less than a value corresponding to the eighth identifier; or when the third identifier and the eighth identifier are determined based on a current phase of a unicast service corresponding to unicast information, the second device sends the second V2X unicast information to the first device based on a fact that a value corresponding to the third identifier is less than a value corresponding to the eighth identifier; or when the third identifier and the eighth identifier are random values, the second device randomly sends the second V2X unicast information to the first device.

In an embodiment, the first V2X unicast information further includes a fifth identifier, the second V2X unicast information further includes a sixth identifier, the fifth identifier indicates a manner for determining the third identifier, and the sixth identifier indicates a manner for determining the fourth identifier.

In an embodiment, the first identifier and the second identifier are DSA identifiers, and the third identifier and the fourth identifier are content count.

In an embodiment, the second V2X unicast information is carried in a DSA data frame or a DSMP data frame.

For more detailed descriptions of the second receiving unit 901, the second sending unit 902, and the determining unit 903, directly refer to related descriptions of the network device in the method embodiments shown in FIG. 4 and FIG. 5. Details are not described herein again.

Figures 10, 11:
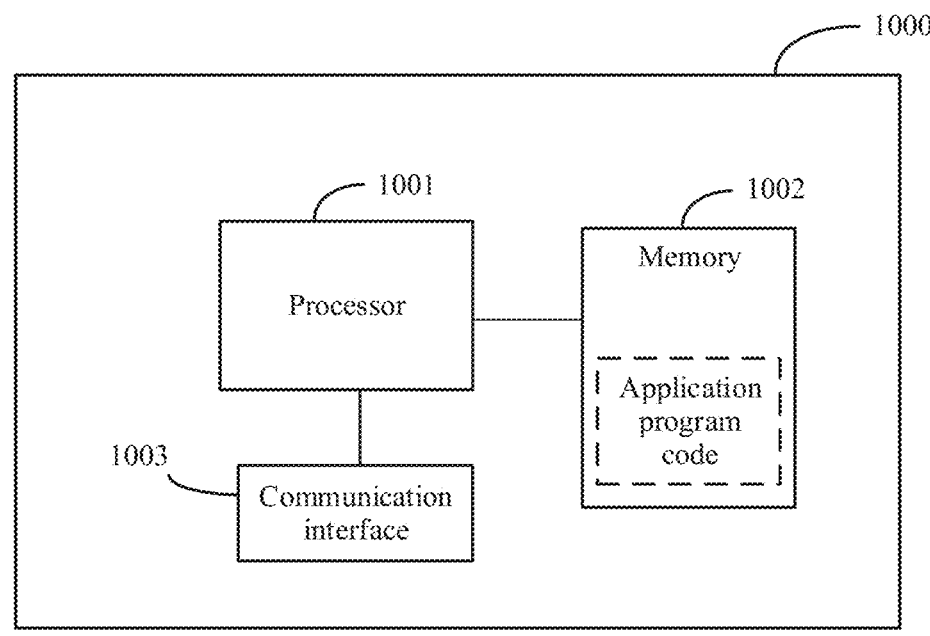
FIG. 10 is a schematic diagram of a structure of still another communication apparatus according to an embodiment of this application.
FIG. 11 is a schematic diagram of a structure of a terminal according to an embodiment of this application.

FIG. 10 is a schematic diagram of a structure of still another communication apparatus according to an embodiment of this application. As shown in FIG. 10, a communication apparatus 1000 includes at least one processor 1001, at least one memory 1002, and at least one communication interface 1003. In addition, the communication apparatus 1000 may further include a general purpose component, for example, an antenna. Details are not described herein.

The processor 1001 may be a general-purpose central processing unit (CPU), a microprocessor, an application-specific integrated circuit (application-specific integrated circuit, ASIC), or one or more integrated circuits for controlling program execution of the foregoing solution.

The communication interface 1003 is configured to communicate with another device or a communication network.

The memory 1002 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, or the like), a magnetic disk storage medium, another magnetic storage device, or any other medium that can be configured to carry or store expected program code in a form of an instruction or a data structure and that can be accessed by a computer. However, this is not limited thereto. The memory may exist independently, and is connected to the processor through a bus. The memory may alternatively be integrated with the processor.

The memory 1002 is configured to store application program code used to execute the foregoing solutions, and the processor 1001 controls execution. The processor 1001 is configured to execute the application program code stored in the memory 1002.

In the communication apparatus shown in FIG. 10, the code stored in the memory 1002 may be executed to perform the communication method provided in FIG. 4 or FIG. 5.

It should be noted that, for a function of the communication apparatus 1000 described in this embodiment of this application, refer to related descriptions in the method embodiments in FIG. 4 and FIG. 5. Details are not described herein again.

FIG. 11 is a schematic diagram of a structure of a terminal according to an embodiment of this application. For ease of description, FIG. 11 shows only main components of the terminal device. As shown in FIG. 11, a terminal device 1100 includes a processor, a memory, a control circuit, an antenna, and an input/output apparatus. The processor is mainly configured to process a communication protocol and communication data, control the entire terminal, execute a software program, and process data of the software program. The memory is mainly configured to store the software program and data. A radio frequency circuit is mainly configured to perform conversion between a baseband signal and a radio frequency signal, and process a radio frequency signal. The antenna is mainly configured to receive and send a radio frequency signal in a form of an electromagnetic wave. The input/output apparatus, for example, a touchscreen, a display, or a keyboard, is mainly configured to receive data entered by a user, and output data to the user.

After the terminal device is powered on, the processor may read a software program in a storage unit, parse and execute instructions of the software program, and process data of the software program. When data needs to be sent wirelessly, the processor performs baseband processing on the to-be-sent data, and outputs a baseband signal to the radio frequency circuit. The radio frequency circuit processes the baseband signal to obtain a radio frequency signal, and sends the radio frequency signal in an electromagnetic wave form through the antenna. When data is sent to the terminal device, the radio frequency circuit receives a radio frequency signal by using the antenna, further converts the radio frequency signal into a baseband signal, and outputs the baseband signal to the processor. The processor converts the baseband signal into data, and processes the data.

For ease of description, FIG. 11 shows only one memory and one processor. In an actual terminal device, there may be a plurality of processors and memories. The memory may also be referred to as a storage medium, a storage device, or the like. This is not limited in this embodiment of the present application.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 11 is integrated with functions of the baseband processor and the central processing unit. Persons skilled in the art may understand that, the baseband processor and the central processing unit may be independent processors, and are interconnected by using a technology such as a bus. Persons skilled in the art may understand that the terminal device may include a plurality of baseband processors to adapt to different network standards, and the terminal device may include a plurality of central processing units to enhance processing capabilities of the terminal device, and components of the terminal device may be connected by using various buses. The baseband processor may also be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of a software program. The processor executes the software program to implement a baseband processing function.

In an example, the antenna and the control circuit that have sending and receiving functions may be considered as a transceiver unit 1101 of the terminal device 1100, and the processor having a processing function may be considered as a processing unit 1102 of the terminal device 1100. As shown in FIG. 11, the terminal device 1100 includes the transceiver unit 1101 and the processing unit 1102. The transceiver unit may also be referred to as a transceiver, a transceiver device, a transceiver apparatus, or the like. Optionally, a device, configured to implement a receiving function, in the transceiver unit 1101 may be considered as a receiving unit, and a device, configured to implement a sending function, in the transceiver unit 1101 may be considered as a sending unit. In other words, the transceiver unit 1101 includes a receiving unit and a sending unit. For example, the receiving unit may also be referred to as a receiver, a receive machine, or a receiving circuit, and the sending unit may also be referred to as a transmitter, a transmit machine, or a transmitting circuit. Optionally, the receiving unit and the sending unit may be one integrated unit, or may be a plurality of independent units. The receiving unit and the sending unit may be in one geographical position, or may be distributed in a plurality of geographical positions.

In an embodiment, the terminal 1100 may be a first device. The processing unit 1102 is configured to perform operations performed by the reselection unit 803 and the generation unit 804 in the foregoing embodiment, and the transceiver unit 1101 is configured to perform operations performed by the first sending unit 801 and the first receiving unit 802 in the foregoing embodiment. The terminal 1100 may be further configured to perform various methods performed by the terminal in the method embodiments in FIG. 4 and FIG. 5. Details are not described again.

Embodiments of this application further provide a chip system, including at least one processor and a communication interface. The communication interface and the at least one processor are interconnected by using a line. The at least one processor is configured to run a computer program or instructions, to perform some or all of the steps described in any one of the method embodiments corresponding to FIG. 4 and FIG. 5. The chip system may include a chip, or may include a chip and another discrete component.

Embodiments of this application further provide a computer-readable storage medium. The computer-readable storage medium may store a program, and the program may be executed to perform some or all of the steps described in the method embodiments corresponding to FIG. 4 and FIG. 5.

Embodiments of this application further provide a computer program. The computer program includes instructions. When the computer program is executed by a computer, the computer is enabled to perform some or all of the steps described in any one of the method embodiments corresponding to FIG. 4 and FIG. 5.

In the foregoing embodiments, the descriptions of each embodiment have respective focuses. For a part that is not described in detail in an embodiment, refer to related descriptions in other embodiments.

It should be noted that, for brief description, the foregoing method embodiments are represented as a series of actions. However, persons skilled in the art should appreciate that this application is not limited to the described order of the actions, because according to this application, some steps may be performed in other orders or simultaneously. It should be further appreciated by persons skilled in the art that embodiments described in this specification all belong to preferred embodiments, and the involved actions and modules are not necessarily included in this application.

In the several embodiments provided in this application, it should be understood that the disclosed apparatus may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The foregoing units described as separate parts may or may not be physically separate, and parts displayed as units may or may not be physical units, may be located in one position, or may be distributed on a plurality of network units. Some or all of the units may be selected based on actual needs to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software function unit.

When the foregoing integrated unit is implemented in the form of a software functional unit and sold or used as an independent product, the integrated unit may be stored in a computer-readable storage medium. Based on such an understanding, the technical solutions in this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device, and may be specifically a processor in a computer device) to perform all or some steps of the foregoing methods described in embodiments of this application. The foregoing storage medium includes any medium that can store program code, such as a USB flash drive, a removable hard disk, a magnetic disk, an optical disc, a read-only memory (Read-Only Memory, ROM for short), or a random access memory (Random Access Memory, RAM for short).

The foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A communication method, comprising:

sending, by a first device, first vehicle to everything (V2X) unicast information to a second device, wherein the first V2X unicast information comprises a first media access control (MAC) address and a first identifier that is not part of the first MAC address;

receiving, by the first device, second V2X unicast information from the second device, wherein the second V2X unicast information comprises a second MAC address and a second identifier that is not part of the second MAC address; and generating another MAC address when the following conditions met: the second V2X unicast information carries indication information, the first MAC address is the same as the second MAC address, and the first identifier is the same as the second identifier, wherein the indication information indicates that the second MAC address is a conflicting address.

2. The method according to claim 1, wherein the first identifier is generated by the first device, and remains unchanged in a transmission process of a unicast service corresponding to the first V2X unicast information.

3. The method according to claim 1, wherein the first V2X unicast information further comprises a third identifier, the third identifier changes in a transmission process of a unicast service corresponding to the first V2X unicast information, and the second V2X unicast information further comprises a fourth identifier; and the generating another MAC address when the second V2X unicast information carries indication information, the first MAC address is the same as the second MAC address, and the first identifier is the same as the second identifier comprises:

generating another MAC address when the second V2X unicast information carries the indication information, the first MAC address is the same as the second MAC address, the first identifier is the same as the second identifier, and the third identifier is the same as the fourth identifier.

4. The method according to claim 3, wherein the third identifier is determined in at least one of the following manners:

a quantity of transmissions of the unicast service corresponding to the first V2X unicast information;

a current phase of the unicast service corresponding to the first V2X unicast information; or a random value.

5. The method according to claim 3, wherein the first V2X unicast information further comprises a fifth identifier, the second V2X unicast information further comprises a sixth identifier, the fifth identifier indicates a manner for determining the third identifier, and the sixth identifier indicates a manner for determining the fourth identifier.

6. The method according to claim 3, wherein the first identifier and the second identifier are dedicated short range communications service advertisement (DSA) identifiers, and the third identifier and the fourth identifier are content count.

7. The method according to claim 1, wherein the second V2X unicast information is carried in a MAC data frame, a DSA data frame, or a dedicated short message protocol (DSMP) data frame.

8. The method according to claim 1, wherein the method further comprises:

generating, by the first device, another identifier after reselecting generating another MAC address.

9. A communication method, comprising:

receiving, by a second device, first V2X unicast information from a first device, wherein the first V2X unicast information comprises a first media access control (MAC) address and a first identifier that is not part of the first MAC address; and sending, by the second device, second V2X unicast information to the first device when the first MAC address conflicts with a MAC address of a third device, wherein the second V2X unicast information comprises indication information, a second MAC address, and a second identifier that is not part of the second MAC address, the indication information indicates that the second MAC address is a conflicting address, the second MAC address is the same as the first MAC address, and the second identifier is the same as the first identifier.

10. The method according to claim 9, wherein the first identifier is generated by the first device, and remains unchanged in a transmission process of a unicast service corresponding to the first V2X unicast information.

11. The method according to claim 9, wherein the method further comprises:

receiving, by the second device, third V2X unicast information from the third device, wherein the third V2X unicast information comprises a third MAC address and a seventh identifier; and that the first MAC address conflicts with a MAC address of a third device comprises:

the first MAC address is the same as the third MAC address, and the first identifier is different from the seventh identifier.

12. The method according to claim 9, wherein the first V2X unicast information further comprises a third identifier, the third identifier changes in a transmission process of a unicast service corresponding to the first V2X unicast information, the second V2X unicast information further comprises a fourth identifier, and the fourth identifier is the same as the third identifier.

13. The method according to claim 12, wherein the method further comprises:

receiving, by the second device, the third V2X unicast information from the third device, wherein the third V2X unicast information comprises a third MAC address, a seventh identifier, and an eighth identifier; and determining, by the second device, that the first MAC address is the same as the third MAC address and the first identifier is different from the seventh identifier; and the sending, by the second device, second V2X unicast information to the first device comprises:

when the third identifier and the eighth identifier are determined based on a quantity of transmissions of a unicast service corresponding to unicast information, sending, by the second device, the second V2X unicast information to the first device based on a fact that a value corresponding to the third identifier is less than a value corresponding to the eighth identifier; or when the third identifier and the eighth identifier are determined based on a current phase of a unicast service corresponding to unicast information, sending, by the second device, the second V2X unicast information to the first device based on a fact that a value corresponding to the third identifier is less than a value corresponding to the eighth identifier; or when the third identifier and the eighth identifier are random values, randomly sending, by the second device, the second V2X unicast information to the first device.

14. The method according to claim 12, wherein the first V2X unicast information further comprises a fifth identifier, the second V2X unicast information further comprises a sixth identifier, the fifth identifier indicates a manner for determining the third identifier, and the sixth identifier indicates a manner for determining the fourth identifier.

15. The method according to claim 12, wherein the first identifier and the second identifier are dedicated short range communication service advertisement (DSA) identifiers, and the third identifier and the fourth identifier are content count.

16. A communication apparatus, comprising:

one or more processors configured to:

send first V2X unicast information to a second device, wherein the first V2X unicast information comprises a first media access control MAC address and a first identifier that is not part of the first MAC address;

receive second V2X unicast information from the second device, wherein the second V2X unicast information comprises a second MAC address and a second identifier that is not part of the second MAC address; and generate another MAC address when the following conditions met: the second V2X unicast information carries indication information, the first MAC address is the same as the second MAC address, and the first identifier is the same as the second identifier, wherein the indication information indicates that the second MAC address is a conflicting address.

17. The apparatus according to claim 16, wherein the one or more processors are configured to generate the first identifier, and wherein the first identifier remains unchanged in a transmission process of a unicast service corresponding to the first V2X unicast information.

18. The apparatus according to claim 16, wherein the first V2X unicast information further comprises a third identifier, the third identifier changes in a transmission process of a unicast service corresponding to the first V2X unicast information, and the second V2X unicast information further comprises a fourth identifier; and the one or more processors are configured to:

generate another MAC address when the second V2X unicast information carries the indication information, the first MAC address is the same as the second MAC address, the first identifier is the same as the second identifier, and the third identifier is the same as the fourth identifier.

19. The apparatus according to claim 18, wherein the third identifier is determined in at least one of the following manners:

a quantity of transmissions of the unicast service corresponding to the first V2X unicast information;

a current phase of the unicast service corresponding to the first V2X unicast information; or a random value.

20. The apparatus according to claim 18, wherein the first V2X unicast information further comprises a fifth identifier, the second V2X unicast information further comprises a sixth identifier, the fifth identifier indicates a manner for determining the third identifier, and the sixth identifier indicates a manner for determining the fourth identifier.

21. The apparatus according to claim 18, wherein the first identifier and the second identifier are dedicated short range communications service advertisement (DSA) identifiers, and the third identifier and the fourth identifier are content count.

* * * * *